US010557635B1

(12) United States Patent
Wanderscheid et al.

(10) Patent No.: US 10,557,635 B1
(45) Date of Patent: Feb. 11, 2020

(54) PORTABLE COOKING ASSEMBLIES

(71) Applicants: Robert Wanderscheid, Houston, TX (US); Jerome Wanderscheid, Rockport, TX (US); Joshua Wanderscheid, San Diego, CA (US)

(72) Inventors: Robert Wanderscheid, Houston, TX (US); Jerome Wanderscheid, Rockport, TX (US); Joshua Wanderscheid, San Diego, CA (US)

( * ) Notice: Subject to any disclaimer, the term of this patent is extended or adjusted under 35 U.S.C. 154(b) by 0 days.

(21) Appl. No.: 16/290,768

(22) Filed: Mar. 1, 2019

Related U.S. Application Data

(63) Continuation-in-part of application No. 15/452,714, filed on Mar. 7, 2017, now abandoned, and a continuation of application No. 15/469,553, filed on Mar. 26, 2017, now abandoned.

(51) Int. Cl.
*F24C 5/20* (2006.01)
*A47J 33/00* (2006.01)

(52) U.S. Cl.
CPC ............... *F24C 5/20* (2013.01); *A47J 33/00* (2013.01)

(58) Field of Classification Search
USPC .............. 126/304 R, 38, 44; 99/449; 431/203
See application file for complete search history.

(56) References Cited

U.S. PATENT DOCUMENTS

| | | | | |
|---|---|---|---|---|
| 2,397,766 A * | 4/1946 | Tullis | ...................... | F23D 11/44 126/38 |
| 2,853,126 A * | 9/1958 | Corlet | ...................... | F24C 3/14 222/5 |
| 3,213,849 A * | 10/1965 | Hirsch | ...................... | F24C 5/20 126/43 |
| 4,105,013 A * | 8/1978 | Vache | ...................... | A47J 36/26 126/38 |
| 5,179,932 A * | 1/1993 | DeCarlo | ............. | A47J 37/0763 126/9 R |
| 6,213,115 B1 * | 4/2001 | Anderson | ............... | A47J 33/00 126/46 |
| D486,348 S * | 2/2004 | Zhu | ................................ | D7/332 |
| 7,107,983 B1 * | 9/2006 | West | ....................... | A47J 33/00 126/25 R |
| 2007/0039603 A1 * | 2/2007 | Lindsly | .................. | A47J 33/00 126/38 |
| 2009/0133688 A1 * | 5/2009 | La | ........................... | A47J 33/00 126/681 |
| 2009/0173238 A1 * | 7/2009 | Martinez | ................. | A47J 33/00 99/352 |
| 2014/0209083 A1 * | 7/2014 | Young | ..................... | A47J 33/00 126/30 |
| 2016/0143476 A1 * | 5/2016 | Yocum | ..................... | F24C 1/16 126/30 |

* cited by examiner

*Primary Examiner* — Nina Bhat
(74) *Attorney, Agent, or Firm* — Elliott & Polasek, PLLC; Douglas H. Elliott; Nathan Q. Huynh

(57) ABSTRACT

Described herein are portable cooking assemblies, including a portable cooking assembly that may include: a first container having a sidewall and an opening; a stove disposed in the first container, the stove comprising: a sidewall having an exhaust aperture and an air intake aperture; a base coupled to the sidewall; and a plurality of legs, wherein at least two of the plurality of legs each may include a first end pivotably coupled to the base; a cooktop plate disposed in the first container; and a lid coupled to the sidewall of the first container and covering the opening, the stove, and the cooktop plate.

20 Claims, 15 Drawing Sheets

1) Exterior Pot/Base with Handle used for cooking
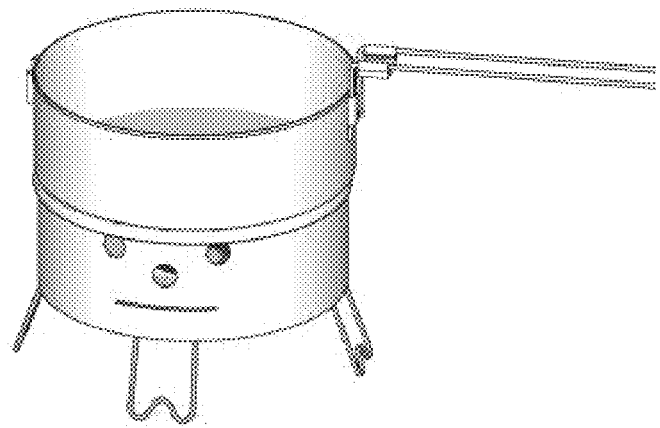
2) Lid/Plate used for cooking
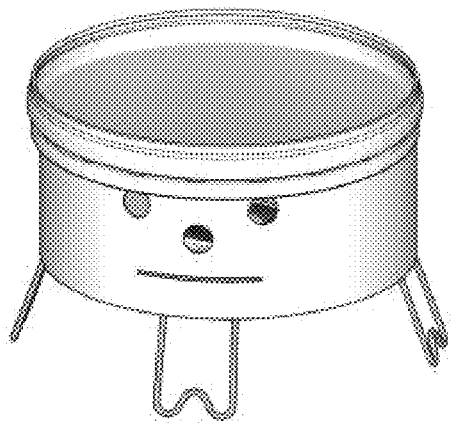
3) Cup cradled in Cook Top
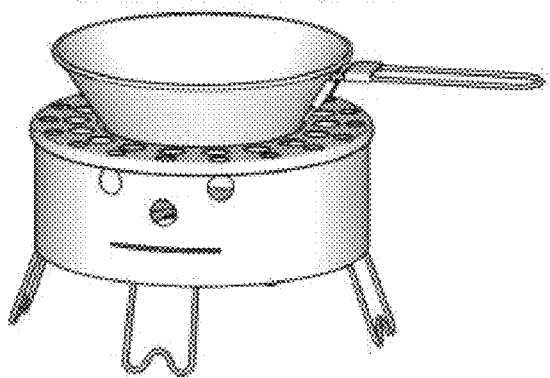
4) Cup sitting on top of Cook Top Insert
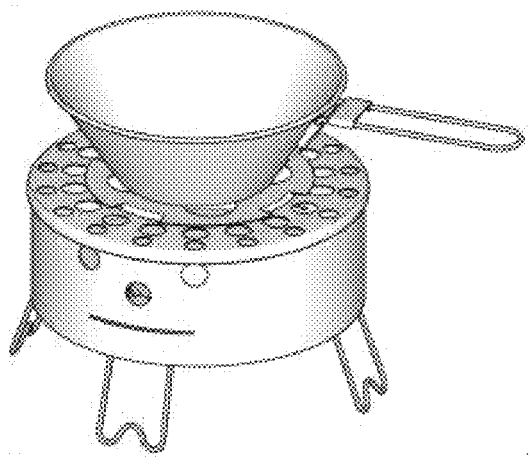
5) Interior Pot used as platform
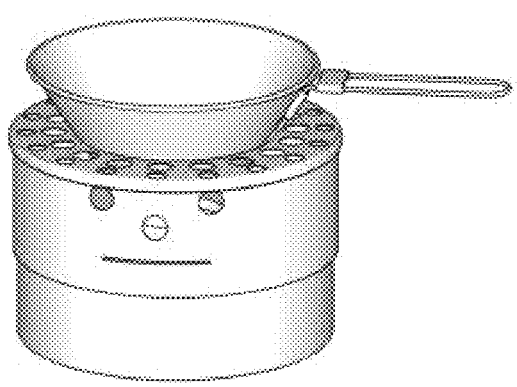
6) Interior Pot used as platform showing the Alcohol Burner
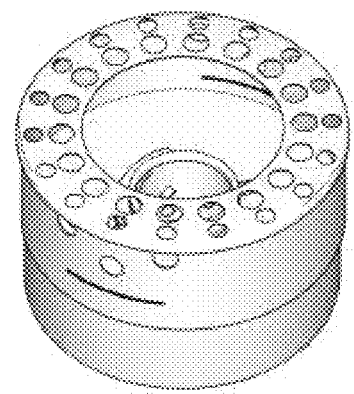
FIG. 9

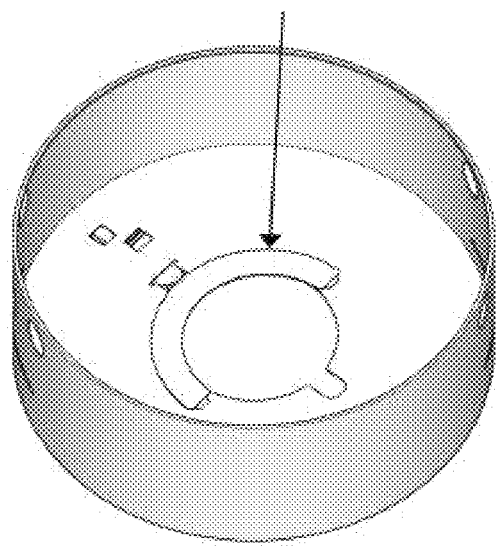
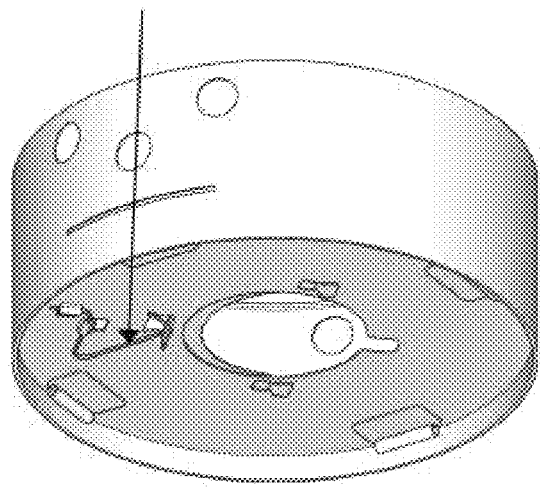
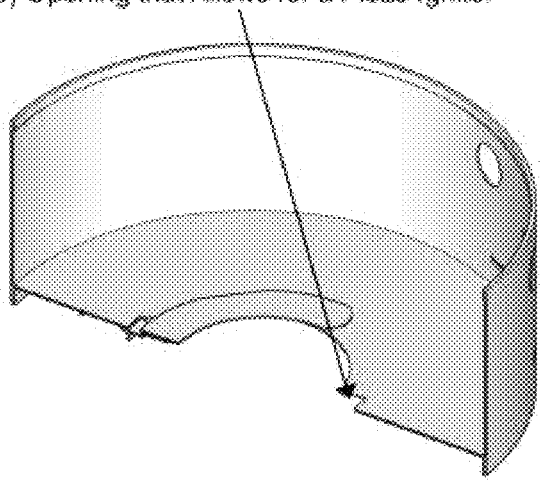
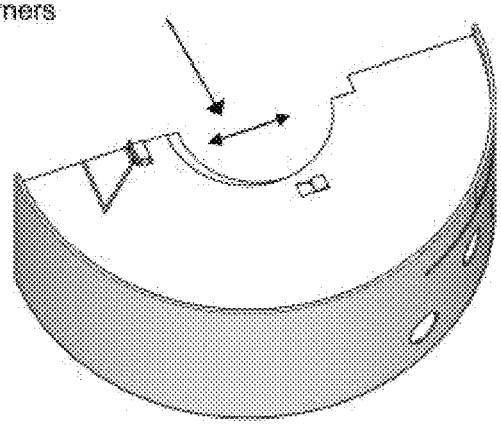
FIG. 11

PORTABLE COOKING ASSEMBLIES

RELATED APPLICATIONS

This application is a continuation-in-part of and claims benefit to co-pending non-provisional application Ser. No. 15/452,714, filed on Mar. 7, 2017 and co-pending non-provisional application Ser. No. 15/469,553, filed on Mar. 26, 2017. This application hereby incorporates herein those applications and all amendments thereto as if set forth in their entireties and claims priority to each of the earlier filing dates of those applications.

BACKGROUND

Field of Inventions

The field of this application and any resulting patent is portable cooking assemblies.

Description of Related Art

There are many known devices for mess kits, stoves, burners, windscreens, cookware, and cups as referenced below; however, the functionality of this product provides: a retention holding method and opening designed to utilize solid fuel, Liquid Fuel burners, piezo igniter, and gas burner; a cook top method designed to cradle various angle styled cups; functional integration between the stove stand and internal cooking pot allowing a secondary method for heating items and/or providing a more stable base while cooking; a functionally integrated stove, stove stand, and windscreen creating the ability to limit certain environmental influences, improved heat distribution; integrated pot handles that retain the base and lid together while providing a clip to location for carrying purposes; a liquid fuel burner designed to be used with a mixing medium; and a gas burner designed to provide this style of quick release and retention to the stove.

In recent years, backpacking stoves, mess kits, solid fuel/liquid fuel burners/gas burners, windscreens, angled styled cups, and cookware have become more sophisticated. However, most of them have only a singular type of focus and design in mind. For example: 1) most mess kits provide only pots and cups requiring you to obtain a stove, a burner, and a windscreen; 2) stove stands are usually designed for integration with a specific type of solid fuel, liquid fuel burner, or gas burner; 3) stoves and stove stands fail to integrate windscreens; 4) stoves fail to have secondary applications for heating other items while cooking; 5) cook tops fail to provide anti-tipping methods when using angled style cups.

Various portable cooking assemblies and methods for cooking food have been proposed and utilized, including some of the methods and structures disclosed in the references appearing on the face of this patent. However, those methods and structures lack the combination of steps and/or features of the methods and/or structures covered by the patent claims below. Furthermore, it is contemplated that the methods and/or structures covered by at least some of the claims of this issued patent solve many of the problems that prior art methods and structures have failed to solve. Also, the methods and/or structures covered by at least some of the claims of this patent have benefits that would be surprising and unexpected to a hypothetical person of ordinary skill with knowledge of the prior art existing as of the filing date of this application.

SUMMARY

The disclosure herein includes a portable cooking assembly, which portable cooking assembly may include: a first container having a sidewall and an opening; a stove disposed in the first container, the stove may include: a sidewall having an exhaust aperture and an air intake aperture; a base coupled to the sidewall; and a plurality of legs, wherein at least two of the plurality of legs each may include a first end pivotably coupled to the base; a cooktop plate disposed in the first container; and a lid coupled to the sidewall of the first container and covering the opening, the stove, and the cooktop plate.

The disclosure herein includes a portable cooking assembly, which portable cooking assembly may include: a stove that may include: a sidewall having an exhaust aperture, an air intake aperture, and an upper edge; and a base coupled to the sidewall; and a plurality of legs, wherein at least two of the plurality of legs each may include a first end pivotably coupled to the base; a cooktop plate disposed on the upper edge of the sidewall; and a first container disposed on the cooktop plate.

The disclosure herein includes a portable cooking assembly, which portable cooking assembly may include: a stove, comprising: a sidewall having an exhaust aperture and an air intake aperture; a base coupled to the sidewall; a clip slidably couple to the base; and legs pivotably coupled to the base; a burner having a portion extending through the base, wherein the clip may be abutted against the portion; a cooktop plate disposed on the sidewall; and a first container disposed on the cooktop plate.

The disclosure herein includes a method of cooking food, which method may include: providing a stove, wherein the stove may include: a wall having an aperture extending therethrough; a base coupled to the wall, the base having an aperture extending therethrough; and legs pivotably coupled to the base; pivoting the legs to a standing position; setting the cooktop on the wall; setting a first container on the cooktop; disposing fuel in the stove; and burning the fuel disposed in the stove.

The first objective is to overcome the confines of space required for all the components to functionally fit within the size and space limitations.

The second objective is to provide a more secure method in retaining various styled angled cups to prevent tipping.

The third objective is to provide a method for the stove to utilize and integrate various fuel sources, including liquid fuel burners, solid fuel, and gas burner.

The fourth objective is to provide a secondary method of functionality in dealing with, stove stand stability issues based on surface conditions.

The fifth objective is to provide a functional means for controlling certain external environment influences on the heat source, while improving heat distribution.

The sixth objective is to provide a secondary method of heating other items when using the apparatus while cooking.

The seventh objective is to create a secure method of holding the lid to the base, while providing the ability to clip the apparatus to another object.

The eighth objective is to create a liquid fuel burner designed to hold a medium paste and configured for controlling and extending fuel life.

BRIEF DESCRIPTION OF THE DRAWINGS

FIG. 9 illustrates perspective views reflecting integration of various components of a portable cooking assembly.

FIG. 11 illustrates a perspective and cross-section view on fuel source retention.

DETAILED DESCRIPTION

1. Introduction

2. Selected Definitions

Figure 1:
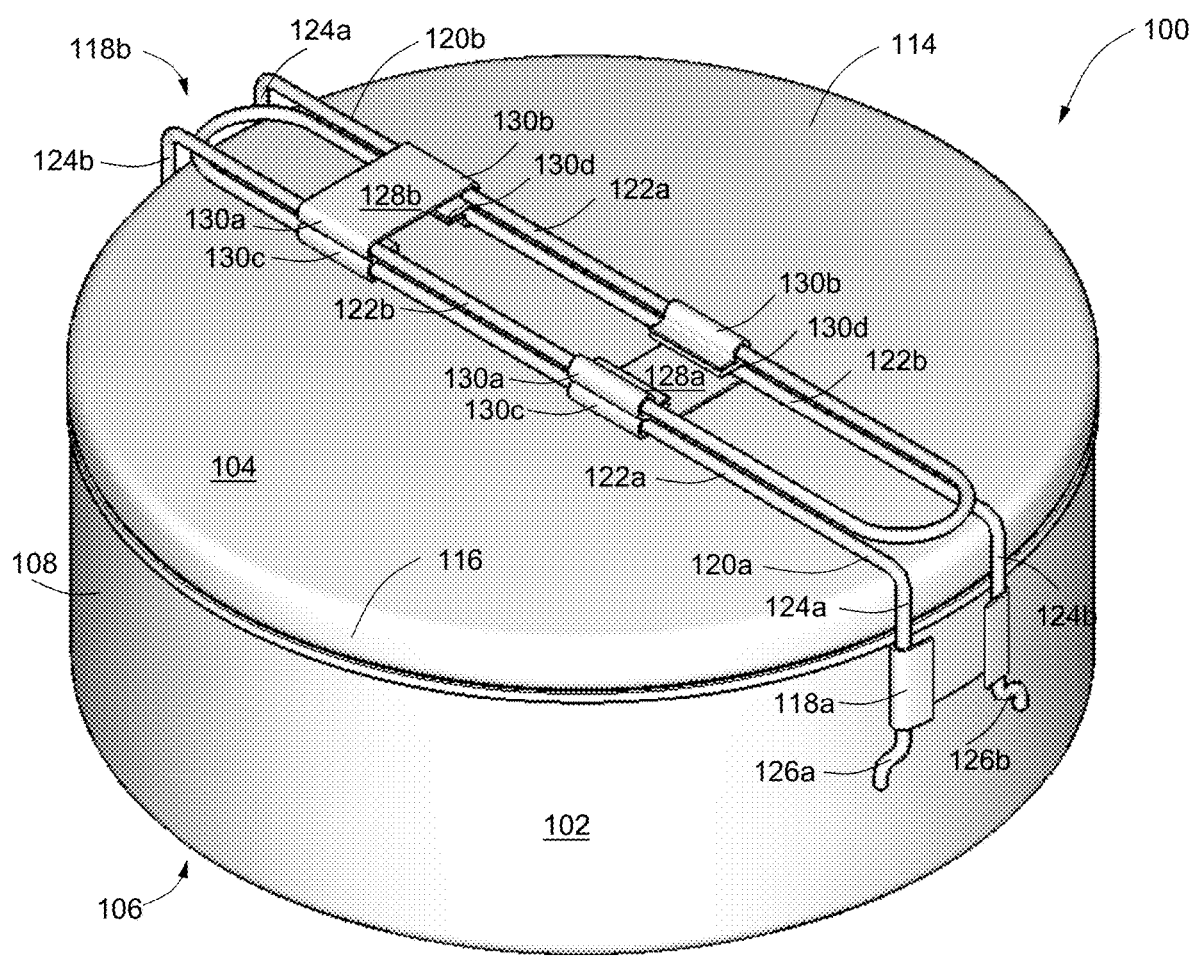
FIG. 1 illustrates a perspective view of a portable cooking assembly.

Certain claims include one or more of the following terms which, as used herein, are expressly defined below. Each of the terms are defined to additionally encompass any structure identified as being in any of the drawings.

The term "abut against" as used herein as a verb is defined as position adjacent to and either physically touch or press against, directly or indirectly. After any abutting takes place with one object relative to another object, the objects may be fully or partially "abutted." For example, a first object may be abutted against a second object such that the second object is limited from moving in a direction of the first object.

The term "adjacent" as used herein means next to and includes physical contact but does not require physical contact.

The term "align" as used herein as a verb is defined as manufacture, form, adjust, or arrange one or more physical objects into a particular position. After any aligning takes place, the objects may be fully or partially "aligned." Aligning preferably involves arranging a structure or a surface of a structure in linear relation to another structure or surface; for example, such that their borders or perimeters may share a set of parallel tangential lines. In certain instances, the aligned borders or perimeters may share a similar profile. Additionally, apertures may be aligned such that a structure or portion of a structure may be extended into and/or through the apertures.

The term "aperture" as used herein is defined as any opening in a solid object or structure, e.g., base, plate, sidewall, stove, cooktop plate, or cooktop insert. For example, an aperture may be an opening that begins on one side of a solid object and ends on the other side of the object. An aperture may also be referred to as an opening. An aperture may alternatively be an opening that does not pass entirely through an object but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., a portion of a handle, a clip, a dish, a burner, or a fuel canister, and/or gas.

The term "assembly" as used herein is defined as any set of components that have been fully or partially assembled together. A group of assemblies may be coupled to form a solid structure or a container having an inner surface and an outer surface.

The term "base" as used herein as a noun is defined as any structure having a planar surface. The base may be a flat plate, e.g., disc. The base may be solid. A base may have one or more apertures. A container, lid, stove, cooktop plate, cooktop insert, pot, and cup may each have a base.

The term "bracket" as used herein is defined as a structure configured for slidable coupling to one or more handles. A bracket may be constructed from a single sheet of material, e.g., plastic, ceramic, carbon fiber, or metal. A bracket may have two ends, in which each end may be folded, preferably to times at 180 degrees each time, to create two bends. Bends of a bracket may receive tines of a handle. Inner surfaces of a bracket may be abutted against tines of a handle.

The term "clasp" as used herein as a noun is defined as a structure configured for coupling to a handle. A clasp may be constructed from a single sheet of material, e.g., plastic, ceramic, carbon fiber, or metal. A clasp may be folded, preferably twice at 180 degrees each time, to create two bends. Thus, the shape of the clasp may be a block-letter "C" or crescent. A clasp may receive prongs of a handle. Inner surfaces of a clasp may be abutted against prongs of a handle.

The term "clip" as used herein is defined as a structure configured for abutting against an object, e.g., a fuel canister or a gas burner. A clip may have a crescent shape. A clip may be flat structure. A clip may be a wire. A clip may have a first surface abutted against a base of a stove and a second surface a fuel canister or a gas burner. Thus, a clip may removably couple a fuel canister or a gas burner to a stove. A clip may be slidably coupled to a base. A clip may be pushed, e.g., by a spring, towards the central axis of a stove.

The term "container" as used herein is defined as a structure, preferably a cylindrical structure, configured to receive another object or structure, fully or partially. For example, a container may be configured to receive a stove, a cooktop plate, a pot, a cup, a fuel canister, a solid fuel dish, and a cooktop insert. A container may be constructed from various material, e.g., metal, ceramic, wood, plastic, carbon fiber, or fiber glass. A container may have a base and a sidewall coupled to the base. A container may have a sidewall extending from a base. A container may have a base coupled to an inner surface of a sidewall. A container may have a base and sidewall that are unitary. A container may have a side that is cylindrical. A container may have an opening at one end. Thus, a container may be open at one end. A container may be open at an end and closed (by a base) at a second end. A container may have an opening defined by an inner surface of a sidewall.

The term "cooktop plate" as used herein is defined as a structure having at least one flat surface configured to be disposed on a stove. A cooktop plate may be formed from a flat piece of metal, ceramic, wood, plastic, carbon fiber, or fiber glass. A cooktop plate may be capable of being coupled to a stove. A cooktop plate may cover an opening, e.g., aperture, of a stove. A cooktop plate may have an inner surface and an outer surface. A cooktop plate may have one or more apertures disposed therethrough. A cooktop plate may have a sidewall extending perpendicular to a surface of the plate.

The term "coupled" as used herein is defined as directly or indirectly connected or attached. A first object may be coupled to a second object such that the first object is positioned at a specific location and orientation with respect to the second object. For example, a piston may be coupled to a frame. A first object may be either permanently, removably, slidably, threadably, and/or pivotably coupled to a second object. Two objects may be "removably coupled" to each other via rivets, pins, threads, tape, latches, hooks, fasteners, locks, male and female connectors, clips, clamps, knots, and/or surface-to-surface contact. For example, a lid and a container may be removably coupled to each other such that the lid may then be uncoupled and removed from the container. Two objects may be "slidably coupled" together, where one object is capable of being slid against a surface of a second object. For example, a sidewall of a lid may be slid against a sidewall of a container is said to be slidably coupled to the container. Additionally, two objects may be capable of being "threadably coupled," e.g., where a threaded outer surface of one object is capable of being engaged with or to a threaded inner surface of another object. Threadably coupled objects may be removably coupled. Accordingly, a cap may be threadably coupled to a fuel canister lid where a threaded inner surface, e.g., box threads or female threads, of the lid may be engaged with a threaded outer surface, e.g., pin threads or male threads, of a canister base.

The term "cup" as used herein is defined as a structure, preferably a cylindrical structure, configured to receive food or liquids, fully or partially. A cup may have a base and a sidewall coupled to the base. A cup may have a sidewall extending from a base. A cup may have a base coupled to an inner surface of a sidewall. A cup may have a base and sidewall that are unitary. A cup may have a side that is cylindrical. A cup may be tapered. A cup may be open at one end. A cup may be open at an end and closed (by a base) at a second end. A cup may have an opening defined by an inner surface of a sidewall.

The term "cylindrical" as used herein is defined as having straight parallel sides and a circular or oval or elliptical cross-section, e.g., shaped like a cylinder. Examples of a cylindrical structure or object include a sidewall, a base, a lid, a container, a stove, a cooktop plate, a pot, a cup, a fuel canister, a solid fuel dish, a cooktop insert, or a clip. A cylindrical object may be completely or partially shaped like a cylinder. For example, a container may have a cylindrical sidewall coupled to a base. Alternatively, a solid cylindrical object may have an inner surface or outer surface having a diameter that changes abruptly. A cylindrical object may have and inner or outer surface having a diameter that changes abruptly to form a "rim," e.g., flange, face, collar, or lip. A cylindrical object may have a rim extending towards or away from the central axis line of the object. A cylindrical object may have a rim disposed on its inner surface. A cylindrical object may have a rim disposed on its outer surface. Additionally, a cylindrical object, may have a rim that is tapered or radiused.

The term "edge" as used herein is defined as any line or border at which any surface terminates, or any line at which two surfaces of a solid object meet. For example, a container, a stove, a pot, and a cup may each have an inner surface and an outer surface forming an edge where the inner surface and the outer surface meet.

The terms "first" and "second" as used herein merely differentiate two or more things or actions, and do not signify anything else, including order of importance, sequence, etc.

The term "fuel canister" as used herein is defined as a structure configured to hold fuel, e.g., alcohol or fuel paste having diatomaceous earth. A fuel canister may include a lid, a canister insert, and a base. A fuel canister may have a canister insert disposed in a base. A fuel canister may have a lid covering an opening of a base.

The term "gas burner" as used herein is defined as a device configured for burning gas fuel. A gas burner may have a portion coupled to a base of a stove. A gas burner may have a portion, e.g., hose coupled to a gas dispenser, e.g., tank.

The term "groove" as used herein is defined as an indentation in a surface or the space defined by two intersecting curved or planar surfaces at an angle, e.g., a channel. A groove may extend in a straight line from one end to another. A groove may be a continuous loop, e.g., around a cylindrical structure. A groove may extend in a meandering path from an end to another, e.g., a S-shaped or C-shaped path. A groove may have a cross-section that is V-shaped or L-shaped. A groove may have a cross-section that is rectangular. A groove may have a cross-section that is arcuate, e.g., U-shaped.

The term "handle" as used as a noun herein is defined as a structure, preferably a cylindrical structure, configured to be gripped by a human hand. A handle may be constructed from a single length of metal wire. A handle may have two tines. A handle may have a tine, a prong, and a foot. A handle may have a tine, a prong, and a foot that are unitary. A handle may be removably coupled to a container, a pot, or a cup. A handle may be removably coupled to a clasp. A handle may be removably coupled to a bracket. A handle may have a portion, e.g., prong and/or foot, abutted against an inner surface of a clasp.

The terms "he," "she," "they," and any other personal pronouns as used herein refer to any gender interchangeably. For example, all uses of "he" encompasses "she" as well.

The term "lid" as used herein is defined as a structure, preferably a cylindrical structure, configured to cover another object or structure, fully or partially. For example, a lid may be configured to cover a container. A lid may be configured to cover an opening of a container. A lid may be constructed from various material, e.g., metal, ceramic, wood, plastic, carbon fiber, or fiber glass. A lid may have a base and a sidewall coupled to the base. A lid may have a sidewall extending from a base. A lid may have a base coupled to an inner surface of a sidewall. A lid may have a base and sidewall that are unitary. A lid may have a side that is cylindrical. A lid may be open at one end. A lid may be open at an end and closed (by a base) at a second end. A lid may have an opening defined by an inner surface of a sidewall. An inner diameter of a sidewall of a lid may be greater than a diameter of an inner surface of a container. A sidewall of a lid may be slidably coupled to a sidewall of a container. An inner surface of a lid may be abutted against inner surface of a container. Alternatively, an inner diameter of a sidewall of a lid may be less than a diameter of an inner surface of a container. An outer surface of a lid may be abutted against inner surface of sidewall.

The term "perpendicular" as used herein is defined as at an angle ranging from 85° or 88 to 92° or 95°. Two structures that are perpendicular to each other may be orthogonal and/or tangential to each other.

The term "pivot" as used as a verb herein is defined as turn, e.g., move, rotate, swivel, revolve, and/or spin around a point. After any pivoting takes place with an object, the object may be "pivoted."

The term "portable cooking assembly" as used herein is defined as an assembly having components configured for cooking food, and some of those components are capable of being disposed in one another. A portable cooking assembly may include a lid, a container, a stove, a cooktop plate, a pot, a cup, a fuel canister, a solid fuel dish, and a cooktop insert.

The term "provide" as used herein as verb is defined as make available, furnish, supply, equip, or cause to be placed in position.

The term "push" as used as a verb herein is defined as apply force e.g., towards and/or against an object or structure, directly or indirectly. Pushing may compel, e.g., urge, cause, influence, force, and/or press, displacement of an object; however, the object may or may not be displaced. A first object pushing a second object may transfer force to the second object. For example, a spring pushing a tab of a clip against a fuel canister or a gas burner, directly or indirectly, may transfer force to the tab and clip. A first object pushing a second object may cause the second object to push a third object, directly or indirectly. For example, a spring pushing a clip may cause the clip to push against a fuel canister or a gas burner, directly or indirectly. A first object directly pushing a second object may physically touch the second object.

The term "sidewall" as used herein is defined as any structure having a planar surface. The sidewall may be a flat plate, e.g., disc. A sidewall may be cylindrical. A sidewall may be continuous. A sidewall may be solid. A sidewall may have one or more apertures. A container, lid, stove, cooktop plate, cooktop insert, pot, and cup may each have one or more sidewalls.

The term "solid fuel dish" as used herein is defined as structure configured for having solid fuel disposed upon. Solid fuels may include wood, charcoal, peat, coal, Hexamine fuel tablets, wood pellets, corn, wheat, rye, and other grains. A solid fuel dish may have a first surface and second surface extending away from the first surface. A solid fuel dish may have a rim abutted against an inner surface of a base of a stove.

The term "stove" as used herein is defined as any apparatus on which fuel is burned or electricity is used to provide heat, e.g., for cooking or heating. A stove may have a surface capable of receiving a plate, a container, a pot, a food item for cooking or heating. A stove may have a flat surface. A stove may have a surface that conducts heat. A stove may have a surface through which heat may pass. A stove may have cooking surface that is a grate. A stove may have solid cooktop surface. A stove may have one or more apertures through which heat may pass. A stove is preferably a cylindrical structure. A stove may have a base and a sidewall coupled to the base. A stove may have a sidewall extending from a base. A stove may have a base coupled to an inner surface of a sidewall. A stove may have a base and sidewall that are unitary. A stove may have a side that is cylindrical. A container may be open at one end. A stove may be open at an end and closed (by a base) at a second end. A stove may have an opening defined by an inner surface of a sidewall. A stove may have a base having a central aperture, e.g., configured to receive a portion of solid fuel dish, a fuel canister, or a burner.

The term "surface" as used herein is defined as any face of a structure. A surface may also refer to that flat or substantially flat area of a structure or object which may, for example, be part of a plate, a base, a lid, a container, a stove, a cooktop plate, a pot, a cup, a fuel canister, a solid fuel dish, a cooktop insert, or a clip. A surface may also refer to that flat or substantially flat area that extend radially around a cylindrical structure or object which may, for example, be part of a plate, a base, a sidewall, a lid, a container, a stove, a cooktop plate, a pot, a cup, a fuel canister, a solid fuel dish, a cooktop insert, or a clip. A surface may have irregular contours. A surface may be formed from coupled components, e.g., a base and sidewall. Coupled components may form irregular surfaces. A plurality of surfaces may be connected to form a polygonal cross-section. An example of a polygonal cross-section may be triangular, square, rectangular, pentagonal, hexagonal, or octagonal.

The term "tapered" as used herein is defined as extending from a first point to a second point while become progressively smaller, e.g., in radius, and/or thinner from the first point to the second point. Structures that are tapered may have a profile that is beveled, frustoconical, and/or conical. Structures that are tapered may be cylindrical.

The term "threaded" as used herein is defined as having threads. Threads may include one or more helical protrusions or grooves on a surface of a cylindrical object. Each full rotation of a protrusion or groove around a threaded surface of the object is referred to herein as a single "thread." Threads may be disposed on any cylindrical structure or object including a fuel canister. Threads formed on an inner surface of an object may be referred to as "box threads." Threads formed on an outer surface of an object may be referred to as "pin threads." A threaded assembly may include a "threaded portion" wherein a section of the threaded assembly includes threads, e.g., pin threads or box threads. A threaded portion may have a diameter sized to extend through an aperture of a base. In certain cases, a threaded portion of a first object may be removably coupled to a threaded portion of a second object.

The term "unitary" as used herein defined as having the nature, properties, or characteristics of a single unit. For example, a base and a sidewall that are individual parts of a container, lid, stove, pot, or cup may be unitary in the sense they are not separate but rather are formed from a single piece of material, e.g., rubber, plastic, carbon fiber, ceramic, or metal.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, plate, a base, a lid, a container, a stove, a cooktop plate, a pot, a cup, a fuel canister, a solid fuel dish, a cooktop insert, and/or a clip. may each have an upper end and a lower end. Additionally, a cylindrical object, e.g., a sidewall, a container, a stove, a cooktop plate, a pot, a cup, a fuel canister, and/or a solid fuel dish, may have an upper portion and a lower portion. The term "top" as used herein means in the highest position, e.g., farthest from the ground. The term "bottom" as used herein means in the lowest position, e.g., closest the ground. For example, a cylindrical object, e.g., plate, a base, a lid, a container, a stove, a cooktop plate, a pot, a cup, a fuel canister, a solid fuel dish, a cooktop insert, and/or a clip, may have a top portion and a bottom portion.

3. Certain Specific Embodiments

The disclosure herein includes a portable cooking assembly, which portable cooking assembly may include: a first container having a sidewall and an opening; a stove disposed in the first container, the stove may include: a sidewall having an exhaust aperture and an air intake aperture; a base coupled to the sidewall; and a plurality of legs, wherein at least two of the plurality of legs each may include a first end pivotably coupled to the base; a cooktop plate disposed in the first container; and a lid coupled to the sidewall of the first container and covering the opening, the stove, and the cooktop plate.

The disclosure herein includes a portable cooking assembly, which portable cooking assembly may include: a stove that may include: a sidewall having an exhaust aperture, an air intake aperture, and an upper edge; and a base coupled to the sidewall; and a plurality of legs, wherein at least two of the plurality of legs each may include a first end pivotably coupled to the base; a cooktop plate disposed on the upper edge of the sidewall; and a first container disposed on the cooktop plate.

The disclosure herein includes a portable cooking assembly, which portable cooking assembly may include: a stove, comprising: a sidewall having an exhaust aperture and an air intake aperture; a base coupled to the sidewall; a clip slidably couple to the base; and legs pivotably coupled to the base; a burner having a portion extending through the base, wherein the clip may be abutted against the portion; a cooktop plate disposed on the sidewall; and a first container disposed on the cooktop plate.

The disclosure herein includes a method of cooking food, which method may include: providing a stove, wherein the stove may include: a wall having an aperture extending therethrough; a base coupled to the wall, the base having an aperture extending therethrough; and legs pivotably coupled to the base; pivoting the legs to a standing position; setting the cooktop on the wall; setting a first container on the cooktop; disposing fuel in the stove; and burning the fuel disposed in the stove.

In any one of the methods or structures disclosed herein, the at least two of the legs each may have a portion extending from the first end towards the central axis of the base.

In any one of the methods or structures disclosed herein, the plurality of legs may be disposed parallel to the plate.

In any one of the methods or structures disclosed herein, the plurality of legs may be pivotably coupled to the plate.

In any one of the methods or structures disclosed herein, the stove may further include a clip slidably coupled to the base.

In any one of the methods or structures disclosed herein, the stove may further include a clip biased towards the center of the base.

Any one of the methods or structures disclosed herein may include a handle removably coupled to the first container.

Any one of the methods or structures disclosed herein may include a handle abutted against the lid.

Any one of the methods or structures disclosed herein may include a handle removably coupled to a clasp coupled to the first container.

Any one of the methods or structures disclosed herein may include handles removably coupled to each other and removably coupled to the lid and the container.

In any one of the methods or structures disclosed herein, the lid may have a sidewall slidably coupled to the sidewall of the first container.

In any one of the methods or structures disclosed herein, the at least two of the plurality of legs each may have a portion extending from the first end away from the central axis of the base.

In any one of the methods or structures disclosed herein, the plurality of legs may be capable of being abutted against the wall.

Any one of the methods or structures disclosed herein may include a handle removably coupled to the first container.

Any one of the methods or structures disclosed herein may include a handle removably coupled to a clasp of the first container.

Any one of the methods or structures disclosed herein may include a fuel dish disposed on the base.

Any one of the methods or structures disclosed herein may include a fuel canister disposed on the base.

Any one of the methods or structures disclosed herein may include a burner having a portion extending through the aperture of the base.

Any one of the methods or structures disclosed herein may include a clip abutted against a portion of a burner.

In any one of the methods or structures disclosed herein, the wall may be continuous.

In any one of the methods or structures disclosed herein, the wall may form a ring.

In any one of the methods or structures disclosed herein, one of the apertures extending through the wall may be elongated.

In any one of the methods or structures disclosed herein, the base may be coupled to an inner surface of the wall.

In any one of the methods or structures disclosed herein, the base may be planar.

In any one of the methods or structures disclosed herein, the aperture of the base may be capable of receiving a portion of a fuel dish.

In any one of the methods or structures disclosed herein, the aperture of the base may be capable of receiving a portion of a burner.

In any one of the methods or structures disclosed herein, the stove may further include a clamp slidably coupled to the base.

In any one of the methods or structures disclosed herein, the stove may further include a clamp biased towards the center of the base.

In any one of the methods or structures disclosed herein, the plurality of legs may be disposed parallel to the plate.

In any one of the methods or structures disclosed herein, the plurality of legs may be pivotably coupled to the plate.

In any one of the methods or structures disclosed herein, the plurality of legs may be capable of being abutted against the wall.

In any one of the methods or structures disclosed herein, the cooktop may have a planar surface.

In any one of the methods or structures disclosed herein, the cooktop may be capable of being disposed on the stove.

In any one of the methods or structures disclosed herein, the cooktop may be disposed in the first container.

In any one of the methods or structures disclosed herein, the cooktop may have a central aperture.

In any one of the methods or structures disclosed herein, the cooktop may have a central aperture and apertures disposed around the central aperture.

In any one of the methods or structures disclosed herein, the cooktop may have a lip.

In any one of the methods or structures disclosed herein, the cooktop may have a lip that is tapered.

In any one of the methods or structures disclosed herein, the cooktop may have a lip that is frustoconical.

Any one of the methods or structures disclosed herein may further include a fuel dish disposed in the first container.

Any one of the methods or structures disclosed herein may further include a cup disposed in the first container.

Any one of the methods or structures disclosed herein may further include a second container disposed in the first container.

Any one of the methods or structures disclosed herein may further include a second container disposed in the stove.

In any one of the methods or structures disclosed herein, the first container may have a bracket removably coupled to a portion of a handle.

In any one of the methods or structures disclosed herein, the first container may have brackets, wherein each bracket may be removably coupled to a portion of a handle.

Any one of the methods or structures disclosed herein may further include a handle removably coupled to the first container.

Any one of the methods or structures disclosed herein may further include a handle abutted against the lid.

Any one of the methods or structures disclosed herein may further include a handle removably coupled to a bracket of the first container.

Any one of the methods or structures disclosed herein may further include handles removably coupled to each other.

Any one of the methods or structures disclosed herein may further include a cooktop insert disposed in the first container.

Any one of the methods or structures disclosed herein may further include a cooktop insert capable of being coupled to the cooktop.

In any one of the methods or structures disclosed herein, the first container, the stove, the cooktop plate, and the lid may be concentric.

In any one of the methods or structures disclosed herein, the first container may be a lid.

In any one of the methods or structures disclosed herein, the first container may be a pot.

In any one of the methods or structures disclosed herein, the first container may be a cup.

In any one of the methods or structures disclosed herein, a portion of the first container may be received in an aperture of the cooktop.

In any one of the methods or structures disclosed herein, the first container may be disposed on a lip of the cooktop.

In any one of the methods or structures disclosed herein, the first container may have a portion extending through an aperture of the cooktop.

In any one of the methods or structures disclosed herein, the plurality of legs may be abutted against the wall.

In any one of the methods or structures disclosed herein, the stove may be capable of being disposed in the first container.

In any one of the methods or structures disclosed herein, the stove may further include a spring coupled to the base and abutted against the clamp.

In any one of the methods or structures disclosed herein, the stove may further include a spring coupled to the base and pushing the clamp towards the center of the base.

In any one of the methods or structures disclosed herein, the base may have an aperture extending therethrough.

Any one of the methods or structures disclosed herein may further include a second container disposed blow the stove.

Any one of the methods or structures disclosed herein may further include a second container capable of being disposed in the first container.

Any one of the methods or structures disclosed herein may further include a second container capable of being disposed in the stove.

Any one of the methods or structures disclosed herein may further include a fuel dish disposed on the base.

Any one of the methods or structures disclosed herein may further include a fuel dish having a portion extending through the aperture of the base.

Any one of the methods or structures disclosed herein may further include a burner having a portion extending through the aperture of the base.

Any one of the methods or structures disclosed herein may further include a handle removably coupled to the first container.

Any one of the methods or structures disclosed herein may further include a handle removably coupled to a bracket of the first container.

Any one of the methods or structures disclosed herein may further include a handle removably coupled to a second container.

In any one of the methods or structures disclosed herein, the stove may further include a clamp slidably coupled to the base.

In any one of the methods or structures disclosed herein, the stove may further include a clamp abutted against a portion of a burner.

Any one of the methods or structures disclosed herein may further include removing the stove from the first container.

Any one of the methods or structures disclosed herein may further include supporting the stove, the cooktop, and the first container with the legs.

Any one of the methods or structures disclosed herein may further include abutting the legs against the wall.

Any one of the methods or structures disclosed herein may further include drawing air through an aperture disposed in the wall.

Any one of the methods or structures disclosed herein may further include expelling exhaust through an aperture disposed in the wall.

Any one of the methods or structures disclosed herein may further include extending a portion of the first container through an aperture of the cooktop.

Any one of the methods or structures disclosed herein may further include setting a second container below the cooktop.

Any one of the methods or structures disclosed herein may further include coupling an end of the burner to the base.

Any one of the methods or structures disclosed herein may further include extending an end of the burner through the base.

Any one of the methods or structures disclosed herein may further include abutting the clamp against an end of the burner.

Any one of the methods or structures disclosed herein may further include setting a cooktop insert on the cooktop.

Any one of the methods or structures disclosed herein may further include setting a cooktop insert on a lip of the cooktop.

Any one of the methods or structures disclosed herein may further include removably coupling a handle to the first container.

Any one of the methods or structures disclosed herein may further include abutting a clamp against a portion of a burner.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific versions of portable cooking assemblies shown in the drawings, which relate to assemblies, elements and parts that can be part of a portable cooking assembly, and methods for cooking food. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

Although the methods, structures, elements, and parts described herein have been described in detail, it should be understood that various changes, substitutions, and alterations can be made without departing from the spirit and scope of the inventions as defined by the following claims. Those skilled in the art may be able to study the preferred embodiments and identify other ways to practice the inventions that are not exactly as described herein. It is the intent of the inventors that variations and equivalents of the inventions are within the scope of the claims, while the description, abstract and drawings are not to be used to limit the scope of the inventions. The inventions is specifically intended to be as broad as the claims below and their equivalents.

FIG. 1 illustrates a perspective view of a portable cooking assembly 100. The portable cooking assembly 100 may include a container 102 and a lid 104. The container 102 may have base 106 and a sidewall 108 (see FIG. 2). The base 106 and the sidewall 108 may be coupled to each other. In addition, the base 106 and the sidewall 108 may be unitary, e.g. formed from a single sheet of metal.

The sidewall 108 of the container 102 may have an inner surface and an outer surface. The inner surface may have an inner perimeter. The outer surface may have an outer perimeter. In addition, the sidewall 108 may extend from the base 106. Also, the sidewall 108 may be perpendicular to the base 106. Accordingly, the sidewall 108 may be continuous. Furthermore, the sidewall 108 may have an upper edge 110 (see FIG. 2 and FIG. 4). The upper edge 110 may define an opening 112 (see FIG. 4). The opening 112 may begin from the upper edge 110 of the sidewall 108 and ends at the inner surface of the base 106.

The lid 104 may have base 114 and a sidewall 116. The base 114 and the sidewall 116 may be coupled to each other. Moreover, the base 114 and the sidewall 116 may be unitary, e.g. formed from a single sheet of metal. In addition, the sidewall 116 may extend from the base 114. Also, the sidewall 116 may be perpendicular to the base 114. Additionally, the sidewall 116 may be perpendicular to the base 114.

The sidewall 116 of the lid 104 may have an inner surface and an outer surface. The inner surface may have an inner perimeter. The outer surface may have an outer perimeter. The sidewall 116 may be continuous. Furthermore, the sidewall 114 may have an upper edge.

The container 102 may be removably coupled to the lid 104. The sidewall 108 of the container 102 may have a portion having an inner perimeter. The sidewall 116 of the lid 104 may have a portion having an outer perimeter. The outer perimeter of the lid 104 may be smaller than the inner perimeter of the container 102. Thus, the portion of the lid 104 may be disposed within the perimeter the portion of the container 102.

Furthermore, the portion of the lid 104 may be sized so that the outer surface of the lid 104 may be slidably coupled to the inner surface of the container 102. Accordingly, the outer surface of the lid 104 may be abutted against the inner surface of the container 102.

Additionally, the portable cooking assembly 100 may include clasps 118a, 118b and two handles 120a, 120b. The handle 120a may be removably coupled to the clasp 118a. The handle 120b may be removably coupled to the clasp 118b.

Each clasp 118 may be a single piece of material, e.g., metal. The clasp 118 may be folded, preferably twice at 180 degrees each time, to create two bends. The shape of the clasp 118 may be a block-letter "C."

Each handle 120 may be a single length of wire, e.g., metal. The wire may be bent in half, preferably at 180 degrees, to form two parallel tines 122a, 122b. Each tine 122 may be further bent, preferably at 90 degrees, to form a prong 124. Each prong 122 may be bent, preferably at 90 degrees, to form a foot 126.

Each handle 120 may be shaped, e.g., having bends, in which the tines 122a, 122b may be aligned parallel with the base 114 of the lid 104. Additionally, each handle 120 may be shaped, e.g., having bends, in which the prongs 124a, 124b may be aligned parallel with sidewall 108 of the container 102.

The prongs 124a, 124b of a handle 120 may extend through portions, e.g., bends, of a clasp 118. In addition, the prongs 124a, 124b may be abutted against inner surfaces of the clasp 118. Moreover, feet 126a, 126b of the handle 120 may be abutted against a lower edge of the clasp 118.

Thus, a person may uncouple the prongs 124a, 124b from the clasp 118 by first pressing together the tines 122a, 122b and/or the prongs 124a, 124b. Next, the person may draw the prongs 124a, 124b away from the clasp 118.

Furthermore, the handles 120a, 120b may be removably coupled to each other via brackets 128a, 128b. Each bracket 128 may be slidably coupled to the handles 120a, 120b. For example, each bracket may have four bends 130a-d. The tines 122a, 122b of the handle 120a may extend through the bends 130a, 130b of the bracket 128a. In addition, the tines 122a, 122b of the handle 120a may extend through the bends 130c, 130d of the bracket 128b. In addition, the tines 122a, 122b of the handle 128b may extend through the bends 130c, 130d of the bracket 128a. Also, the tines 122a, 122b of the handle 120b may extend through the bends 130a, 130b of the bracket 128b. Thus, the brackets 128a, 128b may keep the handles 120a, 120b adjacent each other.

To uncouple the handles 120a, 120b, a person may pull the handles 120a, 120b away from each other. The person may pull on the handles 120a, 120b until the handle 120a is slid out of the bracket 128b and the handle 120b is slid out of the bracket 128a.

Figure 2:
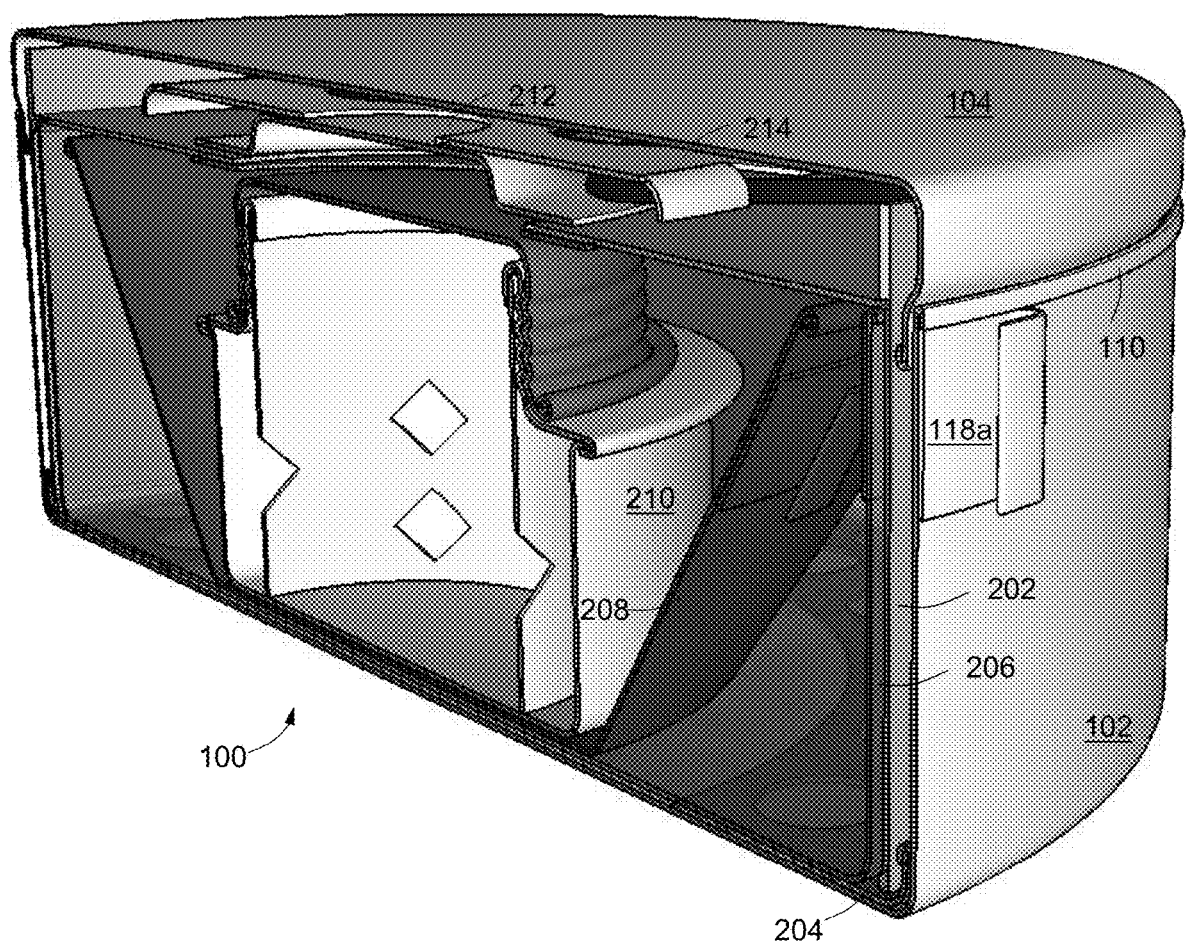
FIG. 2 illustrates a perspective cross-sectional view of a portable cooking assembly.

FIG. 2 illustrates a perspective cross-sectional view of a portable cooking assembly 100 in a packed, e.g., collapsed, configuration. The portable cooking assembly 100 may include a stove 202, a cooktop plate 204, a pot 206, a cup 208, a fuel canister 210, a solid fuel dish 212, and a cooktop insert 214. The pot 206 may be disposed in the stove 202. The cup 208 may be disposed in the pot 206. The fuel canister 210 may be disposed in the cup 208.

The stove 202, the cooktop plate 204, the pot 206, the cup 208, the fuel canister 210, the solid fuel dish 212, and the cooktop insert 214 may all be enclosed within a container 102 and a lid 104. In other words, all of those items may be disposed between the inner surfaces of a base 106 and a sidewall 108 of the container 102 and an inner surface of the lid 104. Furthermore, the lid 104 may cover the container 102.

The stove 202 may have a circular base and a cylindrical sidewall. The base may be coupled to an inner surface of the sidewall. The sidewall may extend circumferentially forming sides of the stove 202. In addition, the sidewall may have a circumferential upper edge and a circumferential lower edge. The upper edge may provide an upper opening in the stove 202. The lower edge may provide a lower opening in the stove 202. Also, the sidewall may have a diameter smaller than a diameter of the container 102. Therefore, the stove 202 may be disposed concentrically in the container 102.

The cooktop plate 204 may be a circular dish. The cooktop plate 204 may have a diameter smaller than the diameter of the container 102. Therefore, the cooktop plate 204 may be disposed within the container 102.

The pot 206 may have a circular base and a cylindrical sidewall. The sidewall may extend from the base. Accordingly, the base and the sidewall may be unitary. In addition, the sidewall may extend circumferentially forming sides of the pot 206. The sidewall may have a circumferential upper edge opposite the base. The upper edge may provide an opening in the pot 206. Also, the sidewall of the pot 206 may have a diameter smaller than the diameter of the sidewall of the stove 202. Therefore, the pot 206 may be disposed through the upper opening of the stove 202. Moreover, the pot 206 may be disposed concentrically in the stove 202.

The cup 208 may have a circular base and a cylindrical sidewall. The sidewall may extend from the base. Accordingly, the base and the sidewall may be unitary. In addition, the sidewall may extend circumferentially forming sides of the cup 208. The sidewall may have a circumferential upper edge opposite the base. The upper edge may have a diameter larger than a diameter of the base. Thus, the sidewall may be tapered. The upper edge may provide an opening in the cup 208. Also, the sidewall of the cup 208 may have a diameter smaller than the diameter of the sidewall of the stove 202. Therefore, the cup 208 may be disposed through the upper opening of the stove 202. Moreover, the pot 206 may be disposed concentrically in the stove 202.

The fuel canister 210 may have a circular base, a cylindrical outer sidewall, a cylindrical inner sidewall, and a cap. The cap may threadably coupled to the outer sidewall. The outer sidewall may extend from the base. Accordingly, the base and the outer sidewall may be unitary. In addition, the sidewall may extend circumferentially forming sides of the fuel canister 210. The sidewall may have a circumferential upper edge opposite the base. The upper edge may provide an opening in the fuel canister 210. Also, the sidewall of the fuel canister 210 may have a diameter smaller than the diameter of the sidewall of the cup 202. Therefore, the fuel canister 210 may be disposed through the opening of the cup 208. Moreover, the fuel canister 210 may be disposed concentrically in the cup 208.

Additionally, the outer sidewall of the fuel canister 210 may be coupled to the inner sidewall of the fuel canister 210. Accordingly, the outer sidewall and the inner sidewall may be concentric. The inner may have one or more apertures disposed therethrough. The one or more apertures may have different shapes, e.g., diamond, circle, square, ellipsoid, rectangular, or any polygon. Preferably, the one or more apertures are disposed below a midline of the inner sidewall. Accordingly, the one or more apertures may be disposed proximate the base of the fuel canister 210.

The solid fuel dish 212 may be a circular dish. The solid fuel dish 212 may have a diameter smaller than the diameter of the sidewall of the stove 202. Therefore, the solid fuel dish 212 may be disposed within the sidewall of the stove 202.

The cooktop insert 214 may be a circular dish. The cooktop insert 214 may have a diameter smaller than the diameter of the sidewall of the stove 202. Therefore, cooktop insert 214 may be disposed within the sidewall of the stove 202.

Figure 3A:
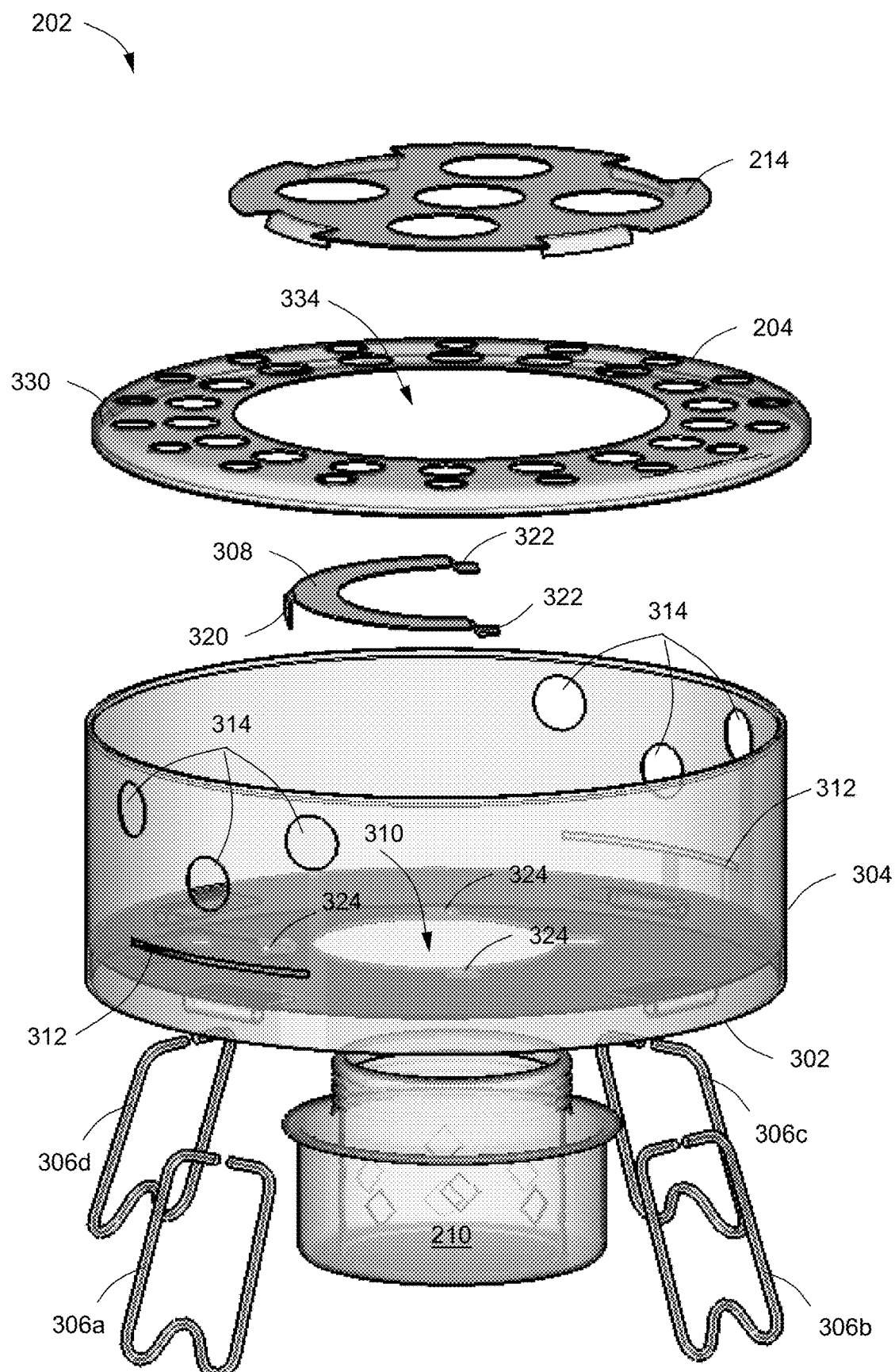
FIG. 3A illustrates an exploded view of a stove.

FIG. 3A illustrates an exploded view of a stove 202. The stove 202 may include a base 302, a sidewall 304, a four legs 306a-d, and a clip 308. The sidewall 304 may have an inner surface and an outer surface. The inner surface and the outer surface may form a circumferential upper edge and a circumferential lower edge. The upper edge may provide an opening in the stove 202. A cooktop plate 204 may be capable of being disposed on the upper edge.

One or more air intake apertures 312 may extend through the inner surface and the outer surface of the sidewall 304. Preferably, the one or more air intake apertures 312 is disposed near a lower edge of the sidewall, e.g., above the base 302. The air intake aperture may be a slit. The air intake aperture may be elongated. Also, one or more exhaust apertures 314 may extend through the inner surface and the outer surface of the sidewall 304. Preferably, the one or more exhaust apertures 314 is disposed near an upper edge of the sidewall 304.

The base 302 may be a flat plate, e.g., disc. The base 302 may have an inner surface and an outer surface. The base 302 may be coupled to the inner surface of the sidewall 304. The base 302 and the sidewall 304 may be perpendicular to each other. Moreover, the base 302 may be coupled to the inner surface of the sidewall 304. Thus, the stove 202 may have an upper opening 316 beginning from the upper edge of the sidewall 304 to the inner surface of the base 302. Also, the stove 202 may have a lower opening 318 from the lower edge of the sidewall 304 to the outer surface of the base 302.

In addition, a central aperture 310 may extend through the inner surface and the outer surface of the base 302. The central aperture 310 may receive a portion of fuel canister 210. Addition, the central aperture 310 may receive a portion of a solid fuel dish (not shown).

Each leg 306 of the four legs 306a-d may be constructed from a single piece of material, e.g., metal, plastic, carbon fiber, or ceramic. Also, the leg 306 may be constructed to have the shape of a block-letter "M." The ends of the leg 306 may each have a bend, preferably at 90 degrees, such that the ends face or point towards each other.

The clip 308 may have the shape of a block-letter "C," e.g., crescent. The clip 308 may be flat. The clip 308 may have an inner edge defining an inner arc. The inner arc may have a radius equal to or greater than that of the central aperture 310 of the base 302.

The clip 308 may have a tab 320 and feet 322. The tab 320 may have a portion extending perpendicular to a plane of the clip 308. Apertures 324 disposed in the base 302 may be capable for receiving the tab 320 and feet 322, respectively.

Figure 3B:
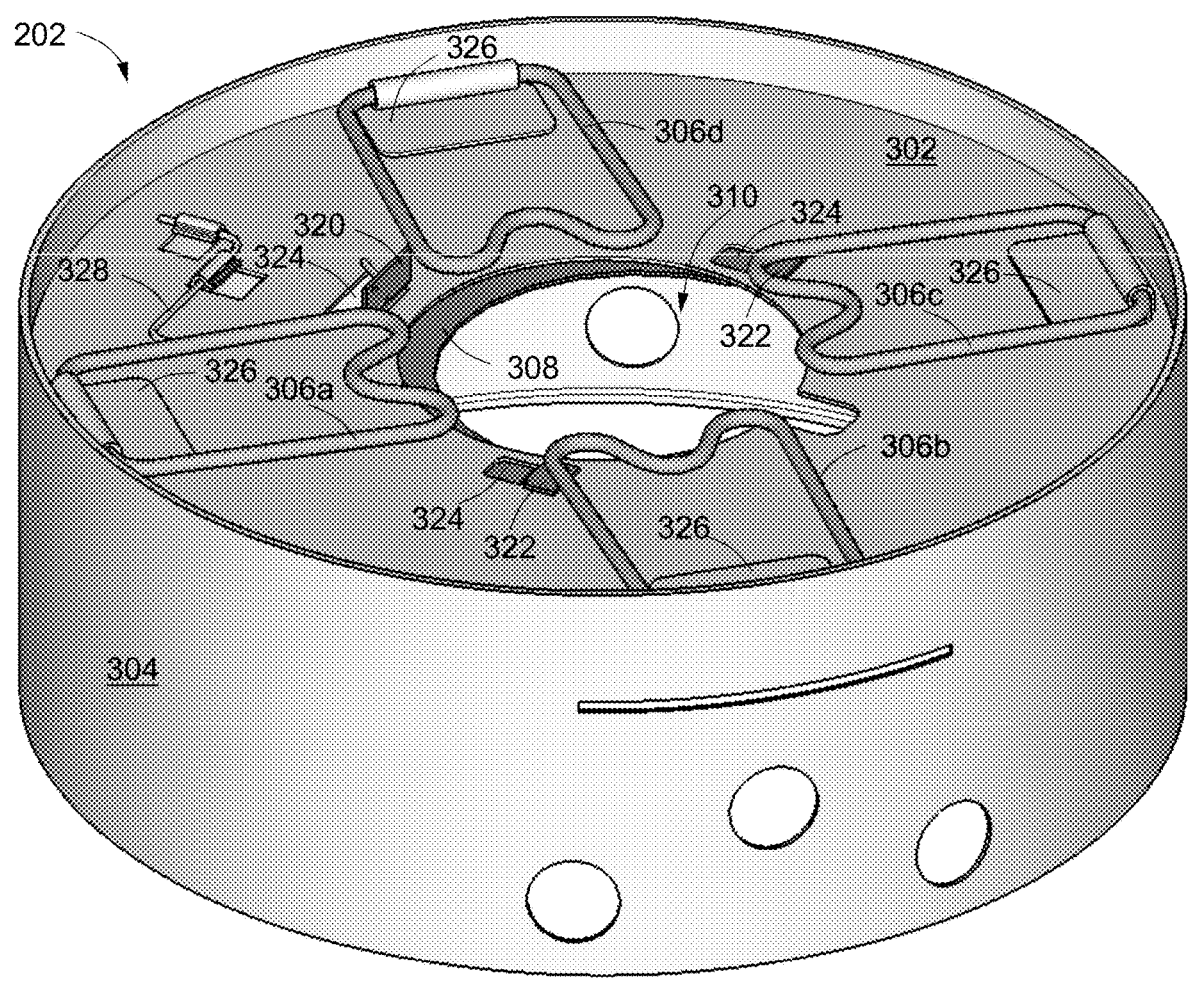
FIG. 3B illustrates a perspective view of a stove having a base facing up.

FIG. 3B illustrates a perspective view of a stove 202 having a base 302 facing up. The stove 202 may include the base 302, a sidewall 304, a four legs 306a-d, and a clip 308. The base 302 may be coupled to the sidewall 302. Also, the base 302 may have an inner surface and an outer surface.

Each leg 306 of the four legs 306a-d may be pivotably coupled to a hinge 326. The hinge 326 may be couples, e.g., via welding, adhesive, or rivets, to the outer surface of the base 302. Ends of the leg 306 may be slid into an aperture of the hinge 326. Thus, the leg 306 may pivot at its connection with the hinge 326. Moreover, the leg 306 may be pivoted to be parallel with the base 302.

The clip 308 may be coupled to the inner surface of the base 302. The clip 308 may have a tab 320 and feet 322. The tab 320 and feet 322 may extend through apertures 324 of the base 302, respectively. Surfaces of the feet 322 may be slid against the outer surface of the base 302. In addition, the surfaces of the feet 322 may be abutted against the outer surface of the base 302. Also, a spring 328 (coupled to the base 302) may have a portion pushing against the tab 320. Thus, the spring 328 and the feet 322 may inhibit the clip 308 from separating from the base 302. However, the clip 308 may be capable of being moved, e.g., slid, in the direction of the spring 328, away from the central aperture 310.

Figure 3C:
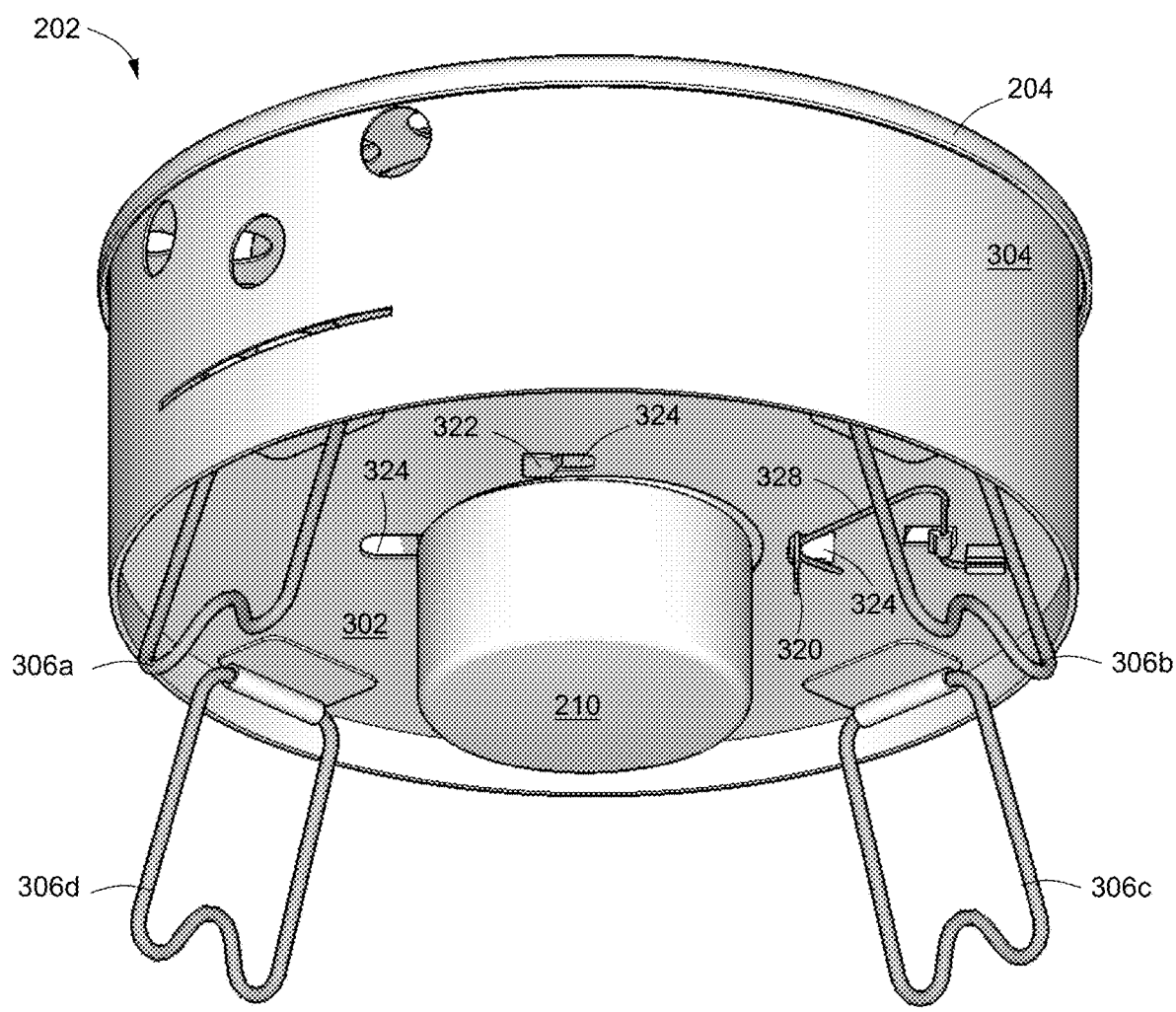
FIG. 3C illustrates a worms-eye perspective view of a stove having four legs pivoted away from a central axis of the stove.

FIG. 3C illustrates a worms-eye perspective view of a stove 202 having four legs 306a-d pivoted away from a central axis of the stove. Each leg 306 may be abutted against an inner surface of the sidewall 304 of the stove 302.

A fuel canister 210 may have a lower portion extending through a central aperture 310 of the base 302 of the stove 202. The fuel canister 210 may have an upper portion (not shown) abutted against an inner surface of the base 302. Thus, the fuel canister 210, in some cases, may not fall through the base 302.

A person may remove the fuel canister 210 from the central aperture 310 by pulling the fuel canister 210 out of the central aperture 310.

Figure 3D:
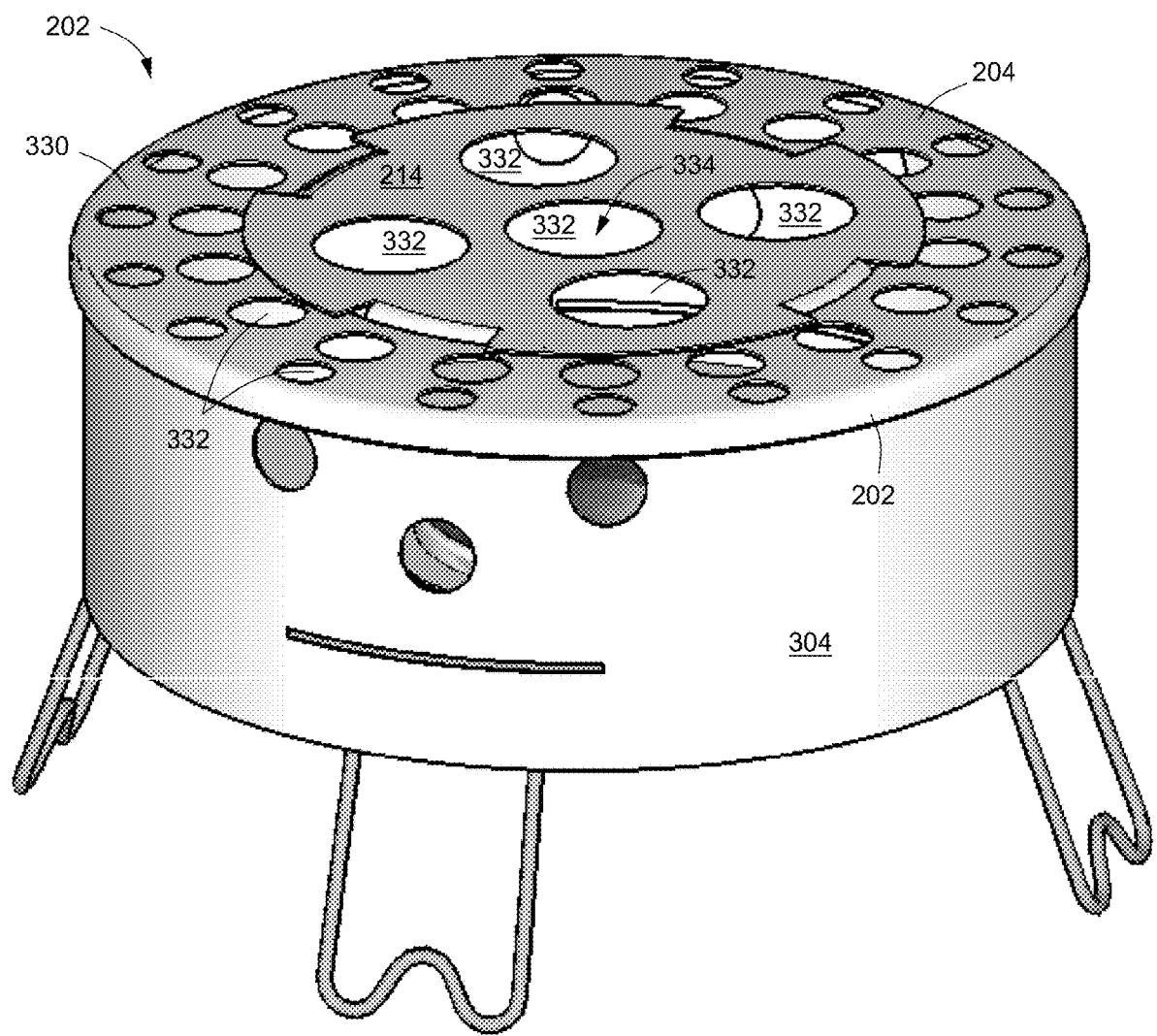
FIG. 3D illustrates a birds-eye perspective of a stove having a cooktop plate disposed on a sidewall.

FIG. 3D illustrates a birds-eye perspective view of a stove 202 having a cooktop plate 204 disposed on a sidewall 304. The cooktop plate 204 may be circular, e.g., disc-shaped. The cooktop plate 204 may have a flat portion 330, e.g., configure for supporting a pot or a cup. The flat portion 330 may have one or more cooking apertures 332 extending therethrough. Moreover, the cooktop plate 204 may have a central opening 334 (see FIG. 3A) configured to receive a portion of a cup 208 (FIG. 2 and FIG. 4).

Furthermore, the central opening 334 may be covered by a cooktop plate insert 214. The cooktop plate insert may have one or more cooking apertures 332 extending therethrough.

In addition, the cooktop plate 204 may have a sidewall 336 extending from the flat portion 330. The sidewall 336 may be disposed around a sidewall 304 of the stove 202.

Figure 4:
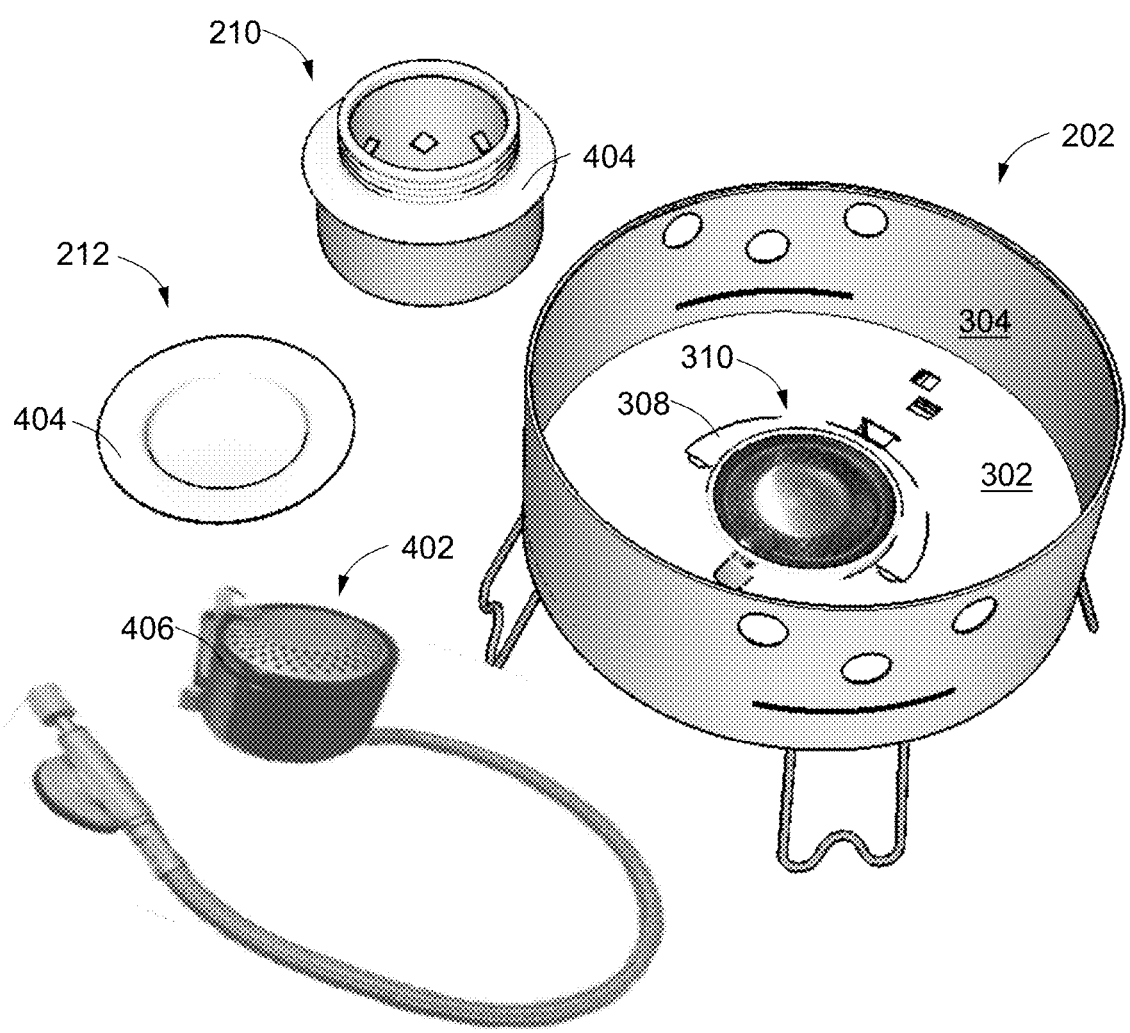
FIG. 4 illustrates a perspective view of a stove and various heat source components capable of being coupled to the stove.

FIG. 4 illustrates a perspective view of a stove 202 and heat source components capable of being coupled to the stove 202. Those components may include a fuel canister 210, a solid fuel dish 212, and a gas burner 402. Furthermore, each component may be coupled to a base 302 of the stove 202.

The base 302 may be a flat plate, e.g., disc. The base 302 may have an inner surface and an outer surface. A central aperture 310 may extend through the inner surface and the outer surface of the base 302.

A fuel canister 210 may have a lower portion and an upper portion. The lower portion may be sized to extend through the central aperture 310 of the base 302 of the stove 202. The upper portion may have a rim 404 extending radially from a sidewall of the fuel canister 210. The rim 404 may have an outer diameter greater than a diameter of an inner edge (defining the central aperture 310). Accordingly, the rim 404 may be capable of being abutted against the inner surface of the base 302. Thus, when coupled to the base 302, the fuel canister 210, in some cases, would not fall through the base 302.

The solid fuel dish 212 may have a first surface and second surface extending away from the first surface. Thus, the first surface may form a rim 404. The rim 404 may have an outer diameter greater than a diameter of an inner edge of the base 302 (defining the central aperture 310). Accordingly, the rim 404 may be capable of being abutted against the inner surface of the base 302. Thus, when coupled to the base 302, the solid fuel dish 212, in some cases, would not fall through the base 302.

The gas burner 402 may have a sidewall sized to be extended through the central aperture 310. A circumferential groove 406 may be disposed in the sidewall. The groove 406 may be capable of being aligned with an inner edge of a clip 308 (FIG. 3A). Additionally, the groove 406 may be capable of receiving the inner edge of the clip 308. Furthermore, the clip 308 may be pushed into the groove 406 by a spring 328 (FIG. 3B and FIG. 3C). Thus, when the gas burner 402 is coupled to the base 302, in some cases, the clip 308 would inhibit the gas burner 402 from dropping out of the base 302.

A person may uncouple the gas burner 402 from the base 302 by first sliding the clip 308 away from the gas burner 402. Next, the person may push and/or pull the gas burner 402 out of the central aperture 310 of the base 302.

Figure 5:
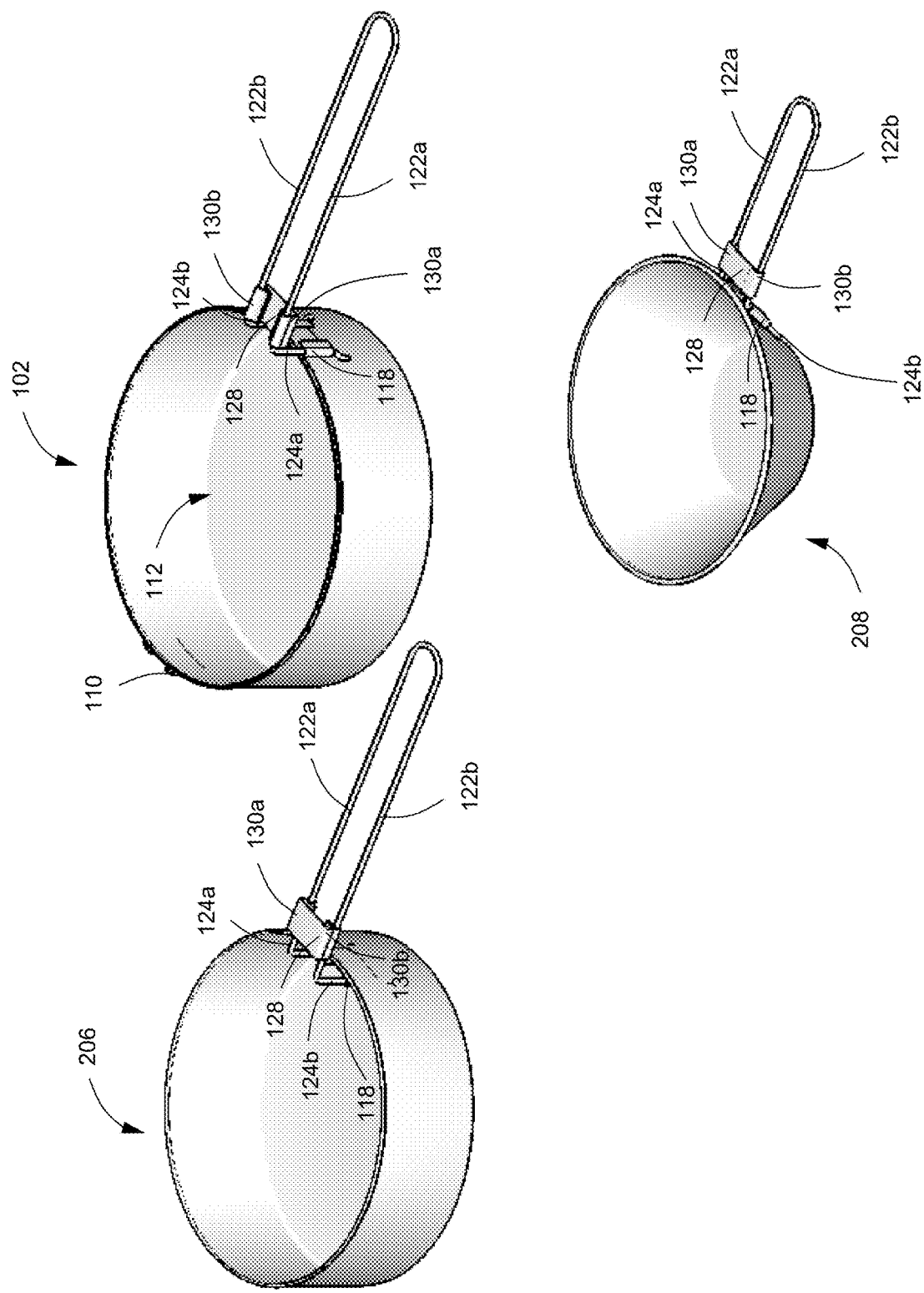
FIG. 5 illustrates a perspective view of a container, a pot, and a cup.

FIG. 5 illustrates a perspective view of a container 102, a pot 206, and a cup 208. The container 102, the pot 206, and the cup 208 may each be disposed on a stove 202 (FIGS. 1-4)

The container 102 may include a clasp 118 and a handle 120. The handle 120 may be removably coupled to the clasp 118. The clasp 118 may have a portion coupled to an outer surface of the container 102. In some cases, the clasp 118 may have a portion coupled to an inner surface of the container 102.

The clasp 118 may be a single sheet of material, e.g., metal. The clasp 118 may be folded, preferably twice at 180 degrees each time, to create two bends. Thus, the shape of the clasp 118 may be a block-letter "C."

The handle 120 may be a single length of wire, e.g., made of metal. The wire may be bent in half, preferably at 180 degrees, to form two parallel tines 122a, 122b. Each tine 122 may be further bent, preferably at 90 degrees, to form a prong 124 (see FIG. 1). Each prong 122 may bent, preferably at 90 degrees, to form a foot 126 (see FIG. 1).

The handle 120 may be coupled to the container 102 such the tines 122a, 122b may extend away from the container 102. The prongs 124a, 124b of the handle 120 may extend through portions, e.g., bends, of the clasp 118. In addition, the prongs 124a, 124b may be abutted against inner surfaces of the clasp 118 (see FIG. 1). Moreover, feet 126*a*, 126*b* may be abutted against a lower edge of the clasp 118 (see FIG. 1).

Thus, a person may uncouple the prongs 124*a*, 124*b* from the clasp 118 by first pressing together the tines 122*a*, 122*b* and/or the prongs 124*a*, 124*b*. Next, the person may draw the prongs 124*a*, 124*b* away from the clasp 118.

A bracket 128 may, in some cases, inhibit the tines 122*a*, 122*b* and/or the prongs 124*a*, 124*b* from being pressed together. The bracket 128 may be slidably coupled to the tines 122*a*, 122*b*. The tines 122*a*, 122*b* may extend through bends 130*a*, 130*b* of the bracket 128. The bracket 128 may be positioned adjacent the prongs 124*a*, 124*b*. Thus, when the tines 122*a*, 122*b* and/or the prongs 124*a*, 124*b* are pressed together, the bracket 128, in some cases, would inhibit the prongs 124*a*, 124*b* from being moved towards each other.

Similar to the container 102, the pot 206 and the cup 208 may each have a clasp 118 coupled thereto as described above. Accordingly, a handle 120 may be similarly coupled to each clasp 118 as well.

Other alternative versions of portable cooking assemblies may be described in reference to FIGS. 6-12.

Figure 6:
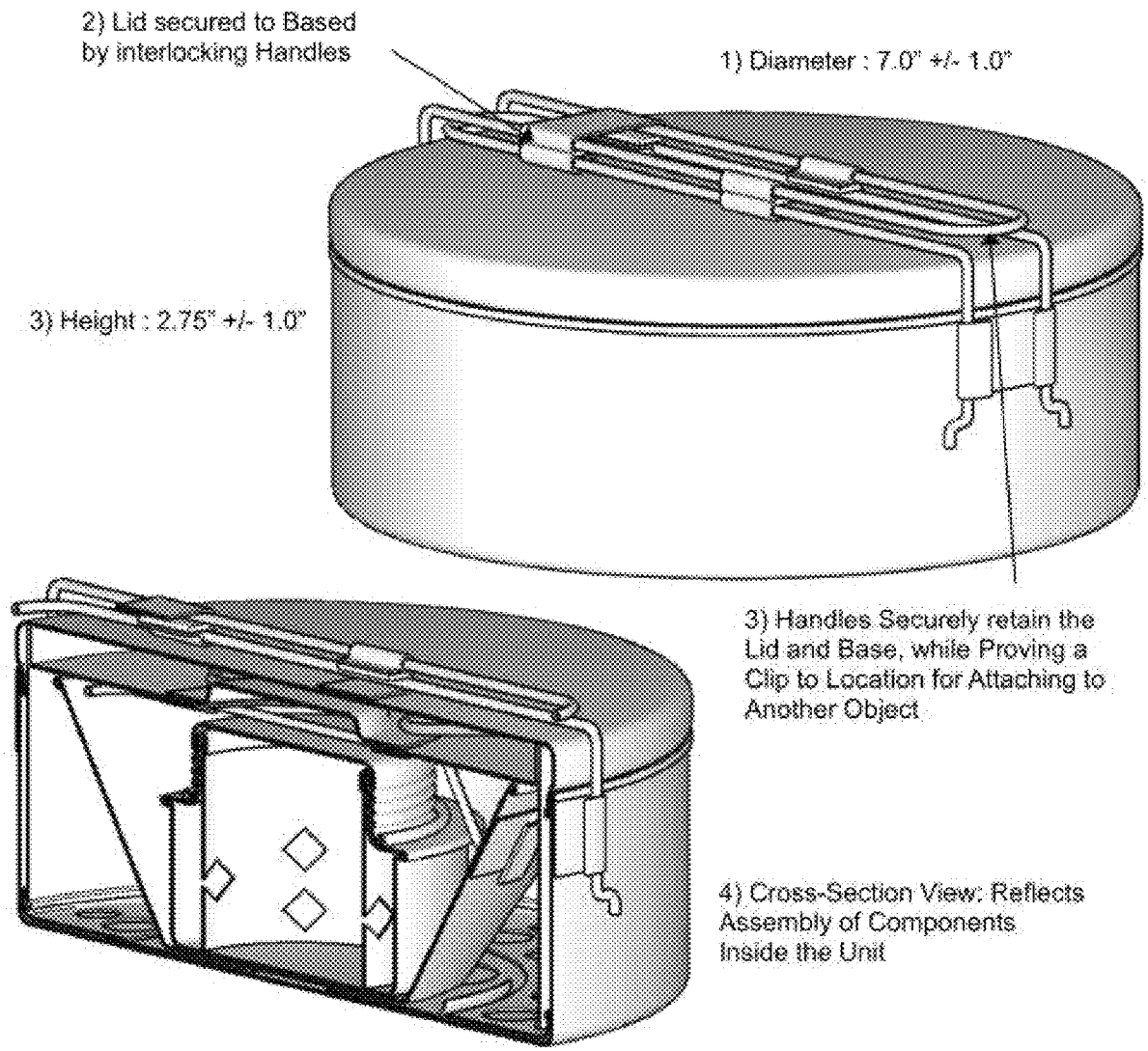
FIG. 6 illustrates perspective and cross-section views portable cooking assembly.

FIG. 6 contains a perspective and cross-section view reflecting the assembled unit and basic dimensions.

Figure 7:
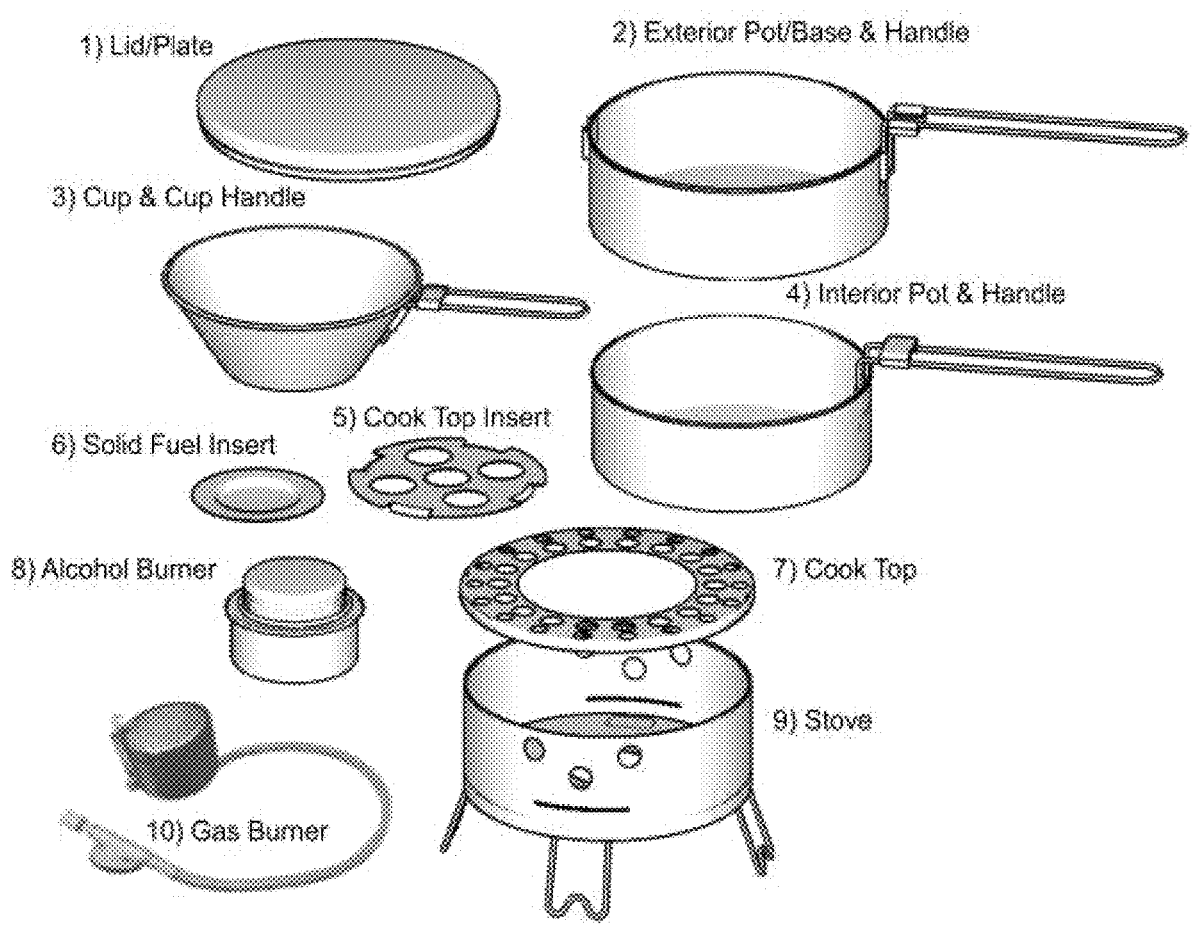
FIG. 7 illustrates an exploded view of a portable cooking assembly.

FIG. 7 is an exploded view reflecting all of the main components including: 1) Lid/Plate, 2) Exterior Pot/Base and Handle, 3) Cup and Handle, 4) Interior Pot and Handle, 5) Cook Top Insert, 6) Solid Fuel Insert, 7) Cook Top, 8) Liquid Fuel Burner, 9) Stove, and 10) Gas Burner.

Figure 8:
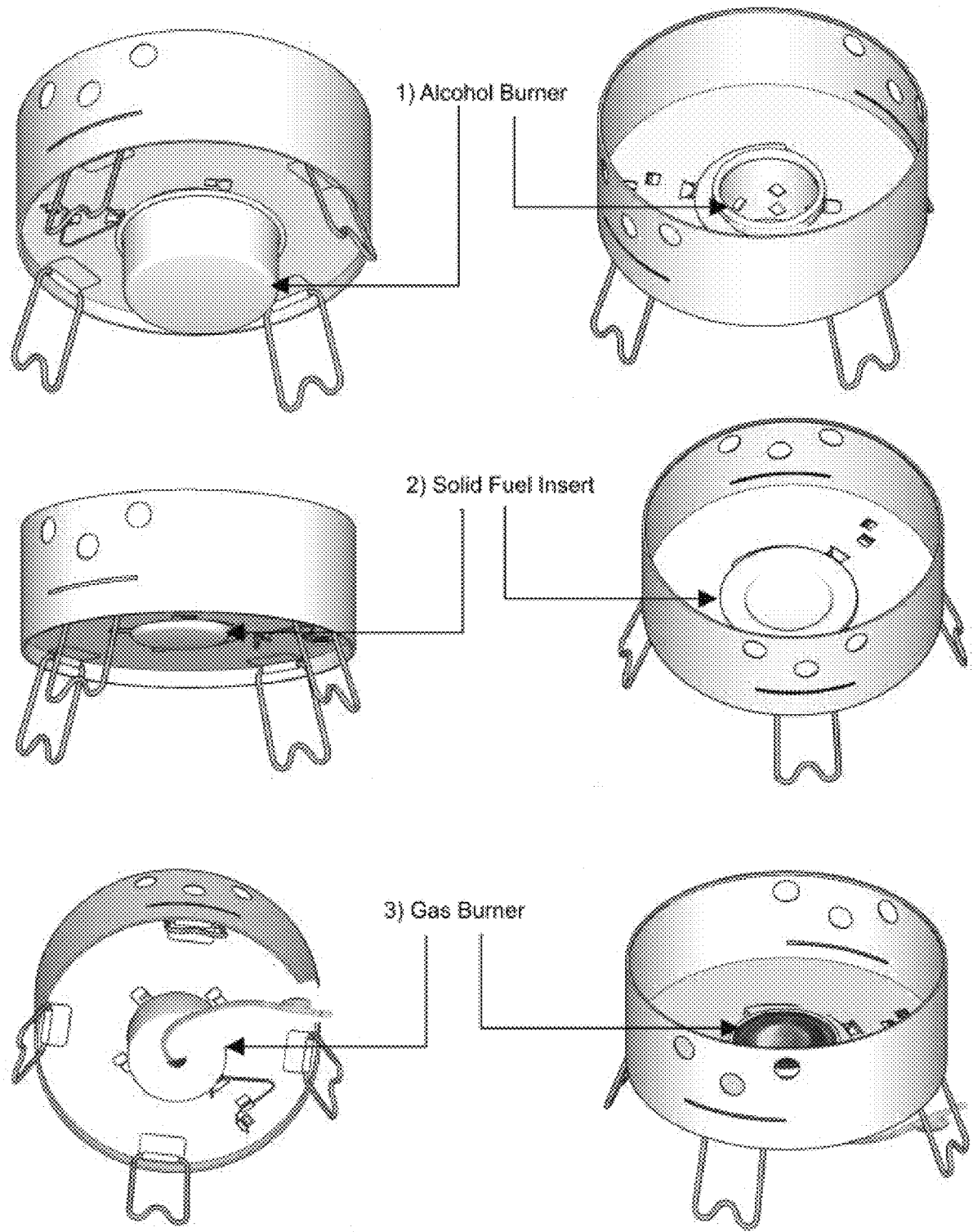
FIG. 8 illustrates perspective views of a liquid fuel burner, solid fuel insert, and a gas burner.

FIG. 8 is perspective views on the fuel integration with: 1) Liquid Fuel Burner; 2) Solid Fuel Insert; and 3) Gas Burner.

FIG. 9 is perspective views reflecting various component cooking arrangements and methods: 1) Exterior Pot/Base with Handle used for cooking; 2) Lid/Plate used for cooking; 3) Cup cradled in Cook Top; 4) Cup sitting on top of Cook Top Insert; 5) Interior Pot used as a platform; and 6) Interior Pot used as platform showing the Liquid Fuel Burner.

Figure 10:
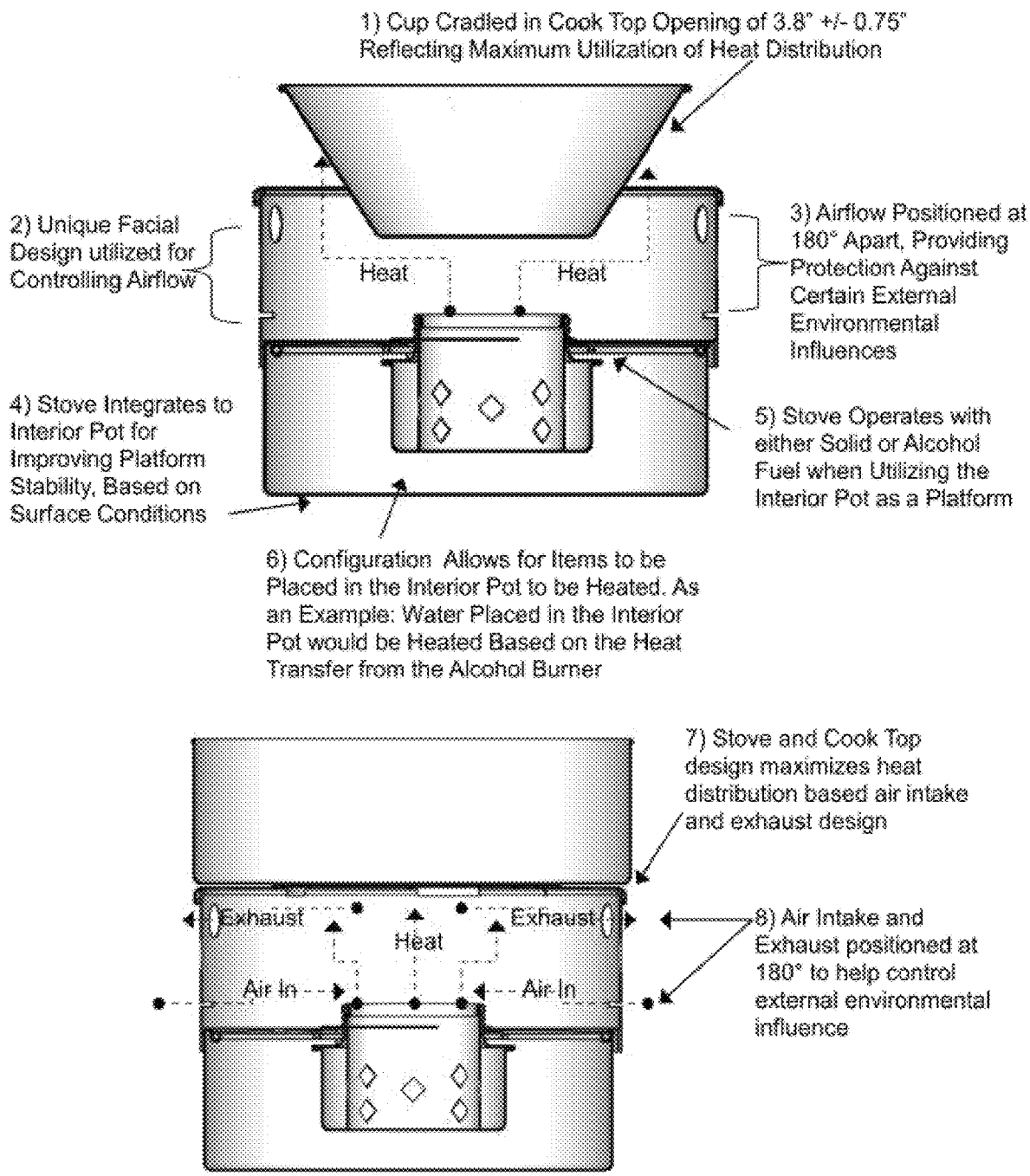
FIG. 10 illustrates a cross-section view of the cook top and interior pot.

FIG. 10 is a cross-section view of the Cook Top and Interior Pot platform functionality: 1) Cup cradled in Cook Top opening of 3.8" +/−0.75" reflecting maximum utilization of heat distribution; 2) Unique facial design utilized for controlling airflow; 3) Airflow positioned 180° apart, provides protection against certain external environmental influences; 4) Stove integrates into Interior Pot for improving platform stability, based on surface conditions; 5) Stove operates with either solid or liquid fuel when utilizing the Interior Pot as a platform; 6) Configuration allows for items placed in the Interior Pot to be heated as an example: water placed in the Interior Pot would be heated based on the heat transfer from the Liquid Fuel Burner; 7) Stove and Cook Top design maximizes heat distribution based on air intake and exhaust design; and 8) Air Intake and Exhaust positioned at 180° to help control external environmental influence.

FIG. 11 is a perspective and cross-section view on fuel source retention functionality and methodology: 1) Retention method based on capturing threads, grooves, divots, etc.; 2) Tensioning for retention method can be provided by spring, clip, screw, pneumatic, etc.; 3) Opening that allows for a piezo igniter; 4) Retention method and opening that allows sufficient travel range to capture various style burners.

Figure 12:
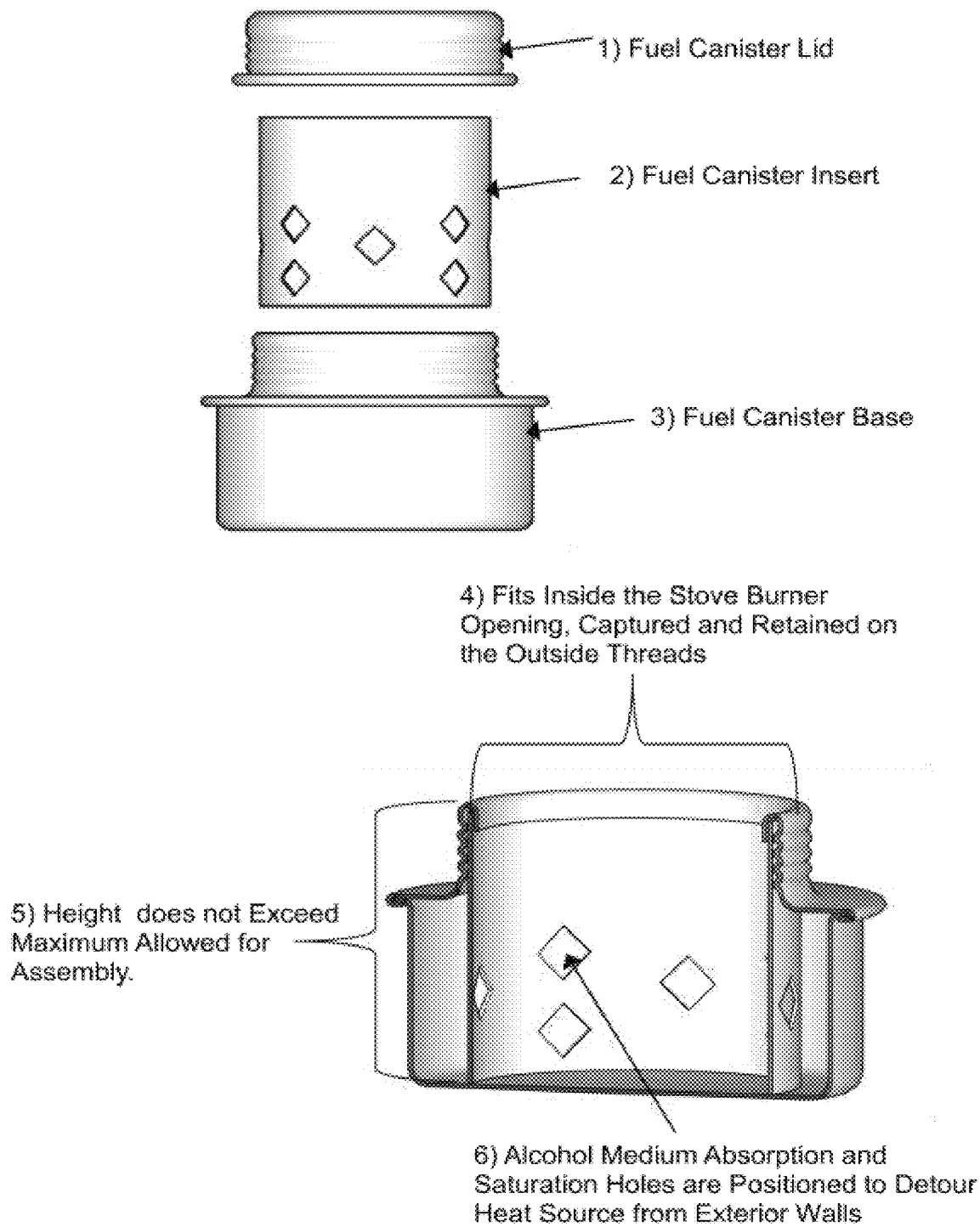
FIG. 12 illustrates an exploded and cross-section view on liquid fuel burner.

FIG. 12 is an exploded and cross-section view on Liquid Fuel burner functionality and methodology: 1) Fuel Canister Lid; 2) Fuel Canister Insert; 3) Fuel Canister Base; 4) Fits inside the Stove burner opening, captured and retained on the outside threads; 5) Height does not exceed maximum allowed for assembly; and 6) Liquid Fuel medium absorption and saturation holes are positioned to deter heat source from exterior walls.

What is claimed as the invention is:

1. A portable cooking assembly, comprising:
    a first container having a first sidewall and an opening;
    a stove disposed in the first container, the stove comprising:
        a second sidewall having an exhaust aperture and an air intake aperture;
        a base coupled to the second sidewall; and
        a plurality of legs, wherein at least two of the plurality of legs each comprises a first end pivotably coupled to the base;
    a cooktop plate disposed in the first container; and
    a lid coupled to the first sidewall of the first container and covering the opening, the stove, and the cooktop plate.

2. The portable cooking assembly of claim 1, wherein each of the plurality of legs has a portion extending from the first end towards the central axis of the base.

3. The portable cooking assembly of claim 1, wherein the plurality of legs are disposed parallel to the plate.

4. The portable cooking assembly of claim 1, wherein the plurality of legs are pivotably coupled to the plate.

5. The portable cooking assembly of claim 1, wherein the stove further comprises a clip slidably coupled to the base.

6. The portable cooking assembly of claim 1, wherein the stove further comprises a clip biased towards the center of the base.

7. The portable cooking assembly of claim 1, further comprising a handle removably coupled to the first container.

8. The portable cooking assembly of claim 1, further comprising a handle abutted against the lid.

9. The portable cooking assembly of claim 1, further comprising a handle removably coupled to a clasp coupled to the first container.

10. The portable cooking assembly of claim 1, further comprising handles removably coupled to each other and removably coupled to the lid and the first container.

11. The portable cooking assembly of claim 1, wherein the lid has a third sidewall slidably coupled to the first sidewall of the first container.

12. A portable cooking assembly, comprising:
    a stove, comprising:
        a sidewall having an exhaust aperture, an air intake aperture, and an upper edge;
        a base coupled to the sidewall; and
        a plurality of legs, wherein at least two of the plurality of legs each comprises a first end pivotably coupled to the base;
    a cooktop plate disposed on the upper edge of the sidewall; and
    a first container disposed on the cooktop plate.

13. The portable cooking assembly of claim 12, wherein the at least two of the plurality of legs each has a portion extending from the first end away from the central axis of the base.

14. The portable cooking assembly of claim 12, wherein the plurality of legs are abutted against the sidewall.

15. The portable cooking assembly of claim 12, further comprising a handle removably coupled to the first container.

16. The portable cooking assembly of claim 12, further comprising a handle removably coupled to a clasp of the first container.

17. The portable cooking assembly of claim 12, further comprising a fuel dish disposed on the base.

18. The portable cooking assembly of claim 12, further comprising a fuel canister disposed on the base.

19. The portable cooking assembly of claim 12, further comprising a burner having a portion extending through the aperture of the base.

20. The portable cooking assembly of claim 12, wherein the stove further comprises a clip abutted against a portion of a burner.

* * * * *